US009097256B2

(12) United States Patent
Yokozawa et al.

(10) Patent No.: US 9,097,256 B2
(45) Date of Patent: Aug. 4, 2015

(54) VORTEX PUMP DEVICE WITH WIRING OUTLET PART

(75) Inventors: Mitsuo Yokozawa, Nagano (JP); Ryoji Shirakami, Nagano (JP)

(73) Assignee: NIDEC CORPORATION (JP)

( * ) Notice: Subject to any disclaimer, the term of this patent is extended or adjusted under 35 U.S.C. 154(b) by 286 days.

(21) Appl. No.: 13/556,492

(22) Filed: Jul. 24, 2012

(65) Prior Publication Data

US 2013/0028765 A1  Jan. 31, 2013

(30) Foreign Application Priority Data

Jul. 25, 2011  (JP) ................................. 2011-162570
Jun. 21, 2012  (JP) ................................. 2012-139684

(51) Int. Cl.
*F04D 5/00* (2006.01)
*F04D 13/06* (2006.01)
*F04D 29/42* (2006.01)
*H02K 3/50* (2006.01)
*H01R 13/52* (2006.01)

(52) U.S. Cl.
CPC ................ *F04D 5/006* (2013.01); *F04D 13/06* (2013.01); *F04D 13/0673* (2013.01); *F04D 13/0693* (2013.01); *F04D 29/426* (2013.01); *H01R 13/5216* (2013.01); *H02K 3/50* (2013.01)

(58) Field of Classification Search
CPC ....... F04D 13/06; F04D 29/40; F04D 29/406; F04D 29/42; F04D 29/426; F04D 29/628; F04D 29/605; F04D 29/08; F04D 29/086; H02K 5/22; H02K 3/50
USPC .................................................. 310/62, 110
See application file for complete search history.

(56) References Cited

U.S. PATENT DOCUMENTS

| 7,422,470 | B2* | 9/2008 | Tsuji ............................. 439/470 |
| 7,696,660 | B2* | 4/2010 | Koike et al. ..................... 310/71 |
| 2006/0099089 | A1* | 5/2006 | Hong et al. ................... 417/366 |
| 2006/0171801 | A1* | 8/2006 | Manabe et al. ............... 415/176 |
| 2007/0099459 | A1* | 5/2007 | Otsuki et al. .................. 439/144 |

FOREIGN PATENT DOCUMENTS

| JP | 2004173393 A | * | 6/2004 |
| JP | 2010-43540 A | | 2/2010 |
| JP | 2010043540 A | * | 2/2010 |

OTHER PUBLICATIONS

Thermosetting Polymer.PDF.*
Thermosetting Polymer—Jun. 13, 2010.*
Iwasaki (JP 2010-043540) English Translation.*

* cited by examiner

*Primary Examiner* — Devon Kramer
*Assistant Examiner* — Christopher Brunjes
(74) *Attorney, Agent, or Firm* — Cantor Colburn LLP

(57) ABSTRACT

A vortex pump device may include a pump case which forms a pump chamber and a stator accommodating chamber partitioned from the pump chamber, and a wiring outlet part for taking out a wiring line within the pump case to an outer side. The pump case is provided with an outer peripheral wall surrounding an upper space formed on an upper side in the stator accommodating chamber. The wiring outlet part includes a wiring outlet port which is formed by cutting out the outer peripheral wall, a wire placing part on which the wiring line taken out from the wiring outlet port to the outer side is placed, and a fixing member with which the wiring line is sandwiched and fixed between the wire placing part.

20 Claims, 10 Drawing Sheets

Fig. 10(a)
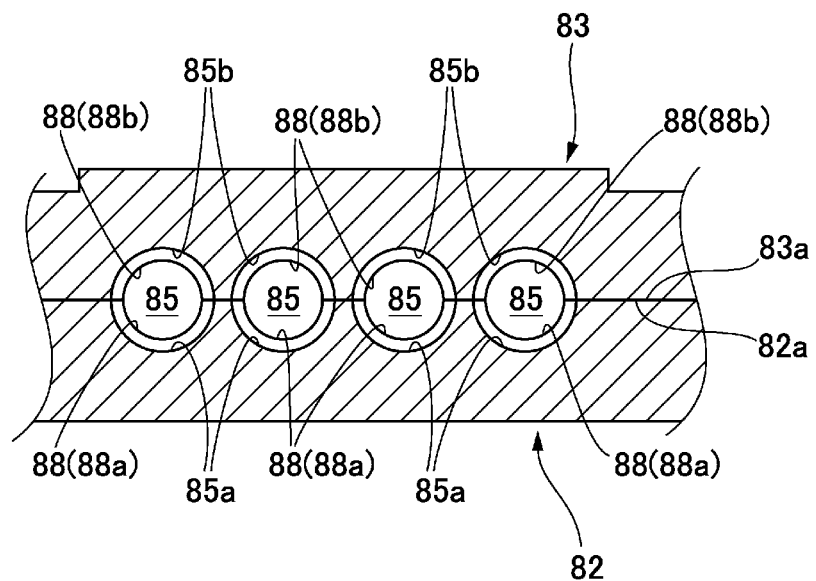
Fig. 10(b)
Fig. 10(c)
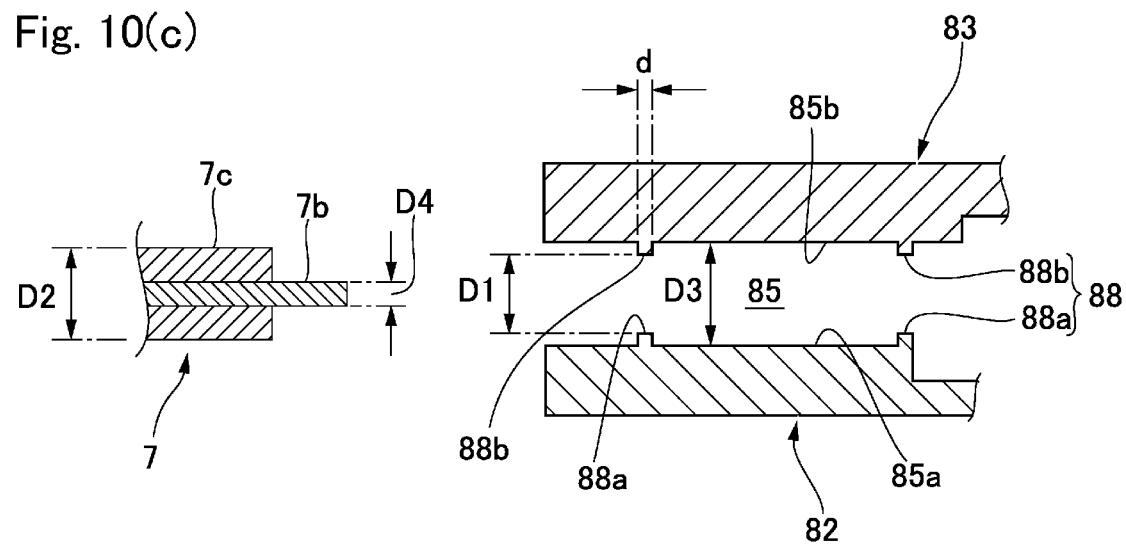

VORTEX PUMP DEVICE WITH WIRING OUTLET PART

CROSS REFERENCE TO RELATED APPLICATION

The present invention claims priority under 35 U.S.C. §119 to Japanese Application Nos. 2011-162570, filed Jul. 25, 2011, and 2012-139684, filed Jun. 21, 2012, the entire content of which are incorporated herein by reference.

FIELD OF THE INVENTION

At least an embodiment of the present invention may relate to a vortex pump device.

BACKGROUND

In recent years, a thin vortex pump device has been proposed as a small pump for cooling electronic components such as a CPU which are disposed in an inside of an information apparatus such as a notebook-sized personal computer. In the vortex pump device, a stator which is structured of salient poles of a stator core and a coil which is wound around the salient poles and a rotor which is provided with an impeller and a magnet are partitioned by a pump case and the rotor is rotated by electromagnetic interaction between the stator and the magnet.

In the vortex pump device, an accommodating chamber which accommodates the stator and a circuit board is sealed by a potting agent (sealing resin having an insulation property) and thereby fluid is prevented from entering into the accommodating chamber from a pump chamber in which the impeller is disposed and, as a result, water proof effect is enhanced. In Japanese Patent Laid-Open No. 2010-43540, this type of a vortex pump device (motor pump) is disclosed.

In the vortex pump device (motor pump) described in the above-mentioned Patent Literature, in order to draw out wiring lines (lead wire) to the outside from a circuit board which is sealed within the accommodating chamber by the sealing agent (potting agent), a wire leading-out bushing is mounted on an outer casing which forms the accommodating chamber and a plurality of wiring lines is drawn out in a state that a plurality of the wiring lines are held by the bushing. The bushing is structured of a base member disposed on a lower side and a cover member disposed on an upper side and, when both of the members are combined with each other, a through hole for passing the wiring line is formed. The through hole is structured so as to pass the wiring line in a tightly contacted state and thus fluid can be prevented from entering from a gap space between the bushing and the wiring line.

Further, in a case that a pump chamber is provided at a bottom part of an outer casing (lower case) and an upper part of the pump chamber is partitioned by an upper case and an accommodating chamber which accommodates a stator and a circuit board is formed in an inside of the upper case, it may be structured that a drawing-out direction of the wiring lines is set to be an upward direction and the wiring lines are drawn out on a liquid face of a sealing agent which is poured in the inside of the upper case.

However, in a case that the wiring lines are drawn out upward, a dimension in an upper and lower direction of the vortex pump device is large and thus the size in the upper and lower direction is not reduced. In order to attain downsizing of the vortex pump device, it is preferable that wiring lines are drawn out from a side face of a case as described in the above-mentioned Patent Literature. However, in the structure described in Patent Literature, a forming die is divided at an embedded position of the bushing and the bushing for binding a plurality of the wiring lines is sandwiched by the forming die and the bushing is embedded in the case. Therefore, mounting work of the bushing is troublesome.

Alternatively, it may be conceivable that wiring lines are passed through a conventional rubber bushing one by one and the rubber bushing is mounted to a wiring taking-out hole which is provided on a side face of a case. However, passing work of the wiring lines through the bushing is troublesome and the bushing itself is expensive.

SUMMARY

In view of the problem described above, at least an embodiment of the present invention may advantageously provide a vortex pump device in which the stator is covered with a sealing agent, the thickness and cost can be reduced and wiring lines are easily drawn out to an outer side of the pump case.

According to at least an embodiment of the present invention, there may be provided a vortex pump device including a rotor and a stator which are coaxially disposed with each other, an impeller which is provided in the rotor, a pump case which forms a pump chamber in which the impeller is disposed and a stator accommodating chamber partitioned from the pump chamber, a side face of the pump case being provided with a suction pipe and a discharge pipe, a sealing agent which is filled in the pump case to a height covering the stator, and a wiring outlet part for taking out a wiring line within the pump case to an outer side. The pump case is provided with an outer peripheral wall surrounding an upper space formed on an upper side with respect to a stator accommodating position in the stator accommodating chamber, and the outer peripheral wall forms a side face of the pump case. In addition, the wiring outlet part includes a wiring outlet port which is formed by cutting out the outer peripheral wall, a wire placing part on which the wiring line taken out from the wiring outlet port to the outer side is placed, and a fixing member with which the wiring line is sandwiched and fixed between the wire placing part and the fixing member, and the fixing member is attached so as to close the wiring outlet port.

In accordance with at least an embodiment of the present invention, a wiring outlet port is formed in the outer peripheral wall forming a side face of the pump case and a wire placing part is provided on an outer side of the wiring outlet port and a fixing member is attached so as to sandwich a wiring line between the wire placing part and the fixing member and so as to close the wiring outlet port. According to this structure, the wiring line is easily taken out from a side face of the pump device and thus a dimension in the axial line direction of the vortex pump device can be reduced and its thickness can be made small.

In accordance with at least an embodiment of the present invention, the pump case is provided with an upper case and a lower case which are assembled in a superposed state in an upper and lower direction, and the pump chamber is provided between the lower case and the upper case, and the stator accommodating chamber and the upper space is provided in the upper case. According to this structure, when the pump case is disassembled, electrical conduction parts embedded by the sealing agent are prevented from contacting with liquid within the pump chamber.

In accordance with at least an embodiment of the present invention, the fixing member is located at a lower position than an end face on an upper side of the outer peripheral wall, the sealing agent is filled to a lower position with respect to the fixing member, and the end face of the upper side of the outer peripheral wall is an attaching face to a member to which the vortex pump device is attached. According to this structure, the fixing member and the sealing agent do not protrude to an upper side with respect to the outer peripheral wall and thus the end face on the upper side of the outer peripheral wall can be abutted with a member to which the vortex pump device is attached.

In accordance with at least an embodiment of the present invention, a width of the fixing member is wider than an opening width of the wiring outlet port, the fixing member is formed with a pair of fitting grooves which are formed by cutting out edge portions in a widthwise direction of the fixing member and, when end parts of the outer peripheral wall facing across the wiring outlet port are respectively fitted to the fitting grooves, the fixing member is press-fitted and fixed between the end parts. According to this structure, the fixing member is easily positioned and press-fitted and fixed to the wiring outlet port and thus attaching of the fixing member is easy.

In this case, it is preferable that a side face of the fitting groove to which the end part of the outer peripheral wall is fitted and a surface of the outer peripheral wall facing the groove side face form a labyrinth structure part. According to this structure, a flow passage length from an inlet port of a gap space between the fitting groove and the end part of the outer peripheral wall to the deepest part of the fitting groove is set to be longer and thus the sealing agent is prevented from flowing to the deepest part of the fitting groove. Therefore, the sealing agent is prevented from leaking out to the outer side from the wiring outlet port to which the fixing member is attached.

In accordance with at least an embodiment of the present invention, the wire placing part is formed with a wiring line holding groove, a wiring line pressing groove is formed in the fixing member at a position facing the wiring line holding groove, and the wiring line holding groove and the wiring line pressing groove form a through hole through which the wiring line is passed when the fixing member is attached to the wiring outlet port. According to this structure, the wiring line is positioned in the wiring line holding groove and thus the wiring line can be easily and orderly taken out. Further, the wiring line is drawn out through the through hole.

In accordance with at least an embodiment of the present invention, a rib-shaped projection protruding to an inner side is formed on each of inner peripheral faces of the wiring line holding groove and the wiring line pressing groove, the rib-shaped projection is extended in a circumferential direction and, when the wiring line holding groove and the wiring line pressing groove form the through hole, the rib-shaped projections form a ring-shaped projection, a surface of the wiring line is covered with insulation coating having resilience, an inner diameter of the ring-shaped projection is smaller than an outer diameter of the wiring line and is larger than an outer diameter of a core wire of the wiring line. According to this structure, when the fixing member is attached, the rib-shaped projection is press-fitted to an insulation coating of the wiring line to be in a state that the rib-shaped projection is bitten into the insulation coating. Therefore, the wiring line is prevented from being drawn out and the sealing agent is prevented from being leaked out to an outer side from a gap space between the wiring line and the fixing member and the wire placing part.

In this case, it is preferable that a wall thickness of the rib-shaped projection in a wiring line length direction is smaller than an outer diameter of the wiring line. According to this structure, a pressing force of the fixing member against the wire placing part for making the ring-shaped projection bite into the insulation coating can be made small. Therefore, the fixing member is attached with a small force and floating of the fixing member is prevented.

Further, it is preferable that the rib-shaped projection is formed on a line connecting end parts of the outer peripheral wall facing across the wiring outlet port with each other. According to this structure, a sealing structure is provided in which the ring-shaped projection is bitten into the insulation coating of the wiring line at the opening position of the wiring outlet port and thus its sealing effect is improved.

In accordance with at least an embodiment of the present invention, the wire placing part is formed with a positioning projection protruding to a side of the fixing member, a positioning hole is formed in the fixing member at a position corresponding to the positioning projection, and the positioning projection is fixed to the positioning hole by thermal welding. According to this structure, the fixing member is fixed at a position where the wiring lines 7 are pressed and floating of the fixing member is prevented and thus a state that the wiring lines are pressed by the fixing member is maintained without using a jig or a pressing member. Further, the fixing member is positioned at the position different from the press-fitting position of the fixing member to the wiring outlet port and thus the inclination of the fixing member (inclination with respect to the wiring line drawing direction) is prevented and the wiring line pressing groove and the wiring line holding groove are correctly faced each other.

In accordance with at least an embodiment of the present invention, the wire placing part is formed with a pair of positioning projections protruding to a side of the fixing member at a pair of positions interposing the wiring line holding groove in a groove width direction, a positioning hole is formed in the fixing member at positions corresponding to the respective positioning projections, and the positioning projections are fixed to the positioning holes by thermal welding. According to this structure, the fixing member is attached horizontally and the wiring line can be pressed uniformly.

In this case, it is preferable that the rib-shaped projection is formed on a line connecting the pair of the positioning projections with each other. According to this structure, the position where the fixing member is prevented from being floated by thermal welding is the position where the ring-shaped projection is bitten into the insulation coating (sealing position) and thus a state that the ring-shaped projection is bitten into the insulation coating is maintained surely. Therefore, a sealing effect is enhanced.

Further, in this case, it is preferable that the fixing member which is attached to the wiring outlet port and a tip end of the positioning projection which is thermally welded to the fixing member do not protrude to an upper side with respect to an upper end of the outer peripheral wall. According to this structure, when an end face on the upper side of the outer peripheral wall is used as an attaching face to a member to which the vortex pump device is attached, the fixing member and the positioning projection are not abutted with the member and thus the end face on the upper side of the outer peripheral wall is tightly contacted with the member. Therefore, the vortex pump device is attached to the member without being inclined.

In accordance with at least an embodiment of the present invention, the pump case is formed in a roughly prism shape, and the wiring outlet part is formed at a corner part of a side face portion of the pump case. According to this structure, a portion of dead space (corner part) of the pump case is utilized and the wiring outlet part is structured compact and thus the size of the vortex pump device is reduced.

In accordance with at least an embodiment of the present invention, the vortex pump includes a base plate which is disposed on an upper side of the stator and is embedded by the sealing agent together with the stator, one end of the wiring line is connected to a face on a stator side of the base plate at the same height as the wiring line holding groove. According to this structure, bending of the wiring line between the wiring line holding groove and the connected part with the base plate is reduced.

In accordance with at least an embodiment of the present invention, the vortex pump includes a base plate which is disposed on an upper side of the stator and is embedded by the sealing agent together with the stator, one end of the wiring line is connected to a face on a stator side of the base plate and is connected to a drive coil of the stator through the base plate. According to this structure, floating of the wiring line is restrained by the base plate and thus the wiring line can be set at a low position.

Further, in this case, it is preferable that the drive coil of the stator is connected to a face of the base plate which is opposite to the stator. According to this structure, connection of the drive coil of the stator with the base plate is easily performed. Also in this case, since the base plate is embedded with the sealing agent, when the pump case is disassembled, connection part (electrical conduction part) of the drive coil with the base plate embedded with the sealing agent is prevented from contacting with liquid within the pump chamber.

In accordance with at least an embodiment of the present invention, the base plate is formed with a pouring hole for the sealing agent, and the pouring hole is disposed on a center axial line of the stator. According to this structure, pouring work of the sealing agent to the stator accommodating chamber is performed easily.

In accordance with at least an embodiment of the present invention, the sealing agent is thermosetting resin. According to this structure, even when a gap space is formed between the wiring outlet port and the fixing member, the potting agent can be cured promptly and thus an amount of the potting agent leaked out from the gap space between the wiring outlet port and the fixing member is reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 10(*a*), 10(*b*) and 10(*c*) are longitudinal sectional views showing a part of a wiring outlet part.

DETAILED DESCRIPTION OF THE PREFERRED EMBODIMENTS

Figure 1A:
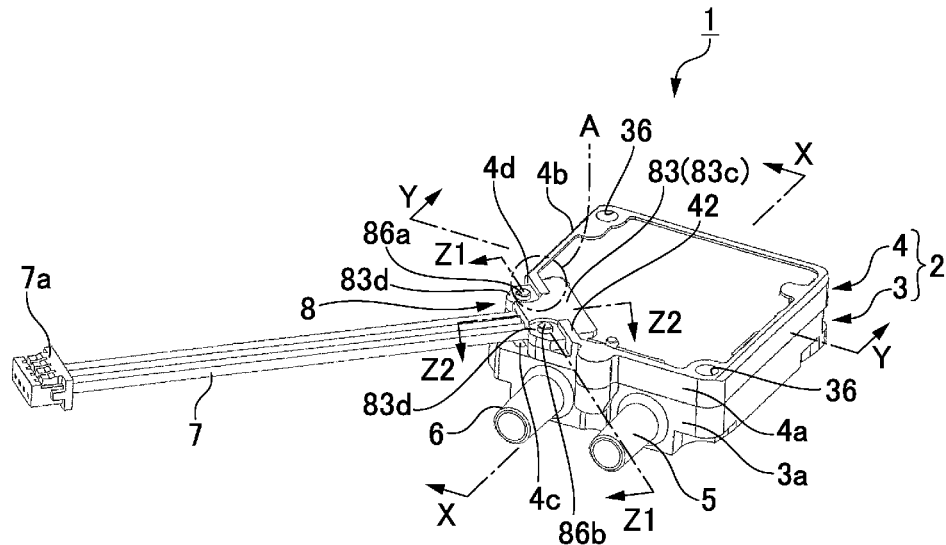
FIGS. 1(*a*), 1(*b*) and 1(*c*) are perspective views and a front view showing a vortex pump device in accordance with an embodiment of the present invention.

A vortex pump device in accordance with an embodiment of the present invention will be described below with reference to the accompanying drawings. In the following description, for convenience of explanation, upper and lower sides of a vortex pump device are described according to an upper and lower direction in the drawing. Further, a side from which a suction pipe and a discharge pipe are protruded (left side in FIG. 2 (*a*)) is referred to as a front side of the vortex pump device, its opposite side (right side in FIG. 2 (*a*)) is referred to as a rear side, a side (front side in FIG. 3) which is turned by 90 degrees in a counterclockwise direction from the front side when viewed from the upper side is referred to as a right side, a side (back side in FIG. 3) which is turned by 90 degrees in a clockwise direction from the front side when viewed from the upper side is referred to as a left side, and an arrangement direction of the suction pipe and the discharge pipe is referred to as a widthwise direction of the device.

(Entire Structure)

Figure 1B:
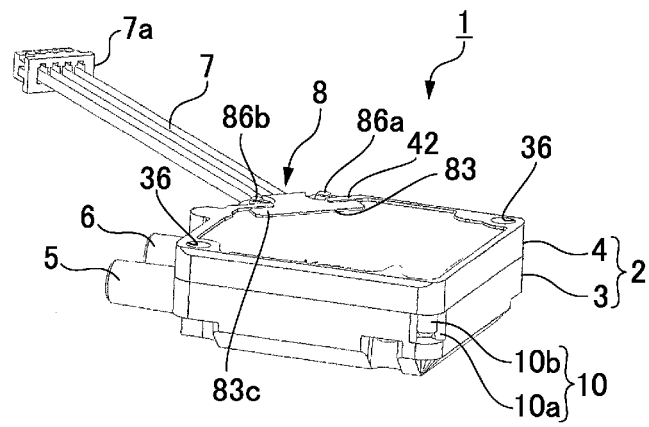
Figure 1C:
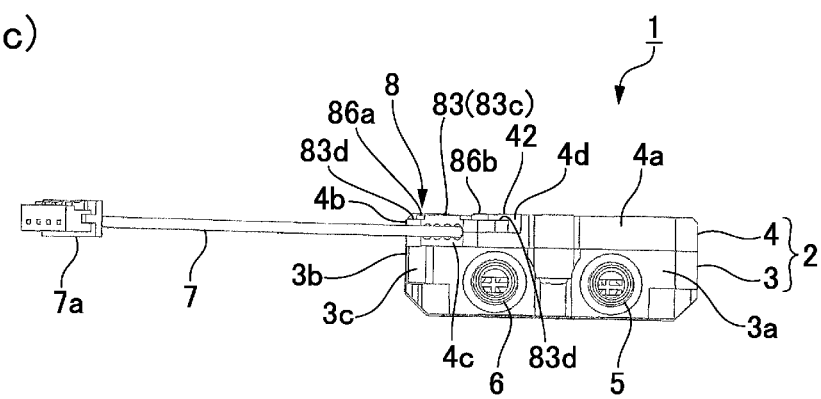

FIG. 1(*a*) is a perspective view showing a vortex pump device in accordance with an embodiment of the present invention which is viewed from a forward obliquely right upper side, FIG. 1(*b*) is a perspective view showing the vortex pump device which is viewed from a rearward obliquely upper right side, and FIG. 1 (*c*) is a front view showing the vortex pump device which is viewed from the front side. A vortex pump device 1 in accordance with an embodiment of the present invention is a vortex pump which pressure-feeds liquid such as refrigerant. The vortex pump device 1 is provided with a pump case 2 which is formed in a roughly flat rectangular prism shape whose shape when viewed from an upper side is a roughly square shape.

The pump case 2 is structured of a lower case 3 and an upper case 4. Both of the lower case 3 and the upper case 4 are a resin molded product and made of thermoplastic resin such as PPS (polyphenylene sulfide). A suction pipe 5 and a discharge pipe 6 are protruded in parallel toward the front side from a front face 3*a* of the lower case 3. A front face 4*a* of the upper case 4 and a side face 4*b* adjacent to the front face 4*a* in the clockwise direction structure an upper side face portion of the pump case 2. A wiring outlet part 8 for taking out wiring lines 7 from an inner side of the pump case 2 is provided at a corner part between the front face 4*a* and the side face 4*b*. The wiring lines 7 are drawn out from a midway position in an axial line direction (height direction) of the vortex pump device 1 through the wiring outlet part 8 toward an obliquely left front side. A connector 7*a* is attached to tip ends of the wiring lines 5.

A corner part of a side face of the upper case which is provided with the wiring outlet part 8 is formed with an inclined face 4*c* by cutting out a tip end of the corner part at an obliquely 45 degrees. The inclined face 4*c* intersects the front face 4*a* and the side face 4*b* and is extended in an axial line direction. A corner portion of the lower case 3 located on a lower side of the wiring outlet part 8 is formed with a hook 9

Figure 3:
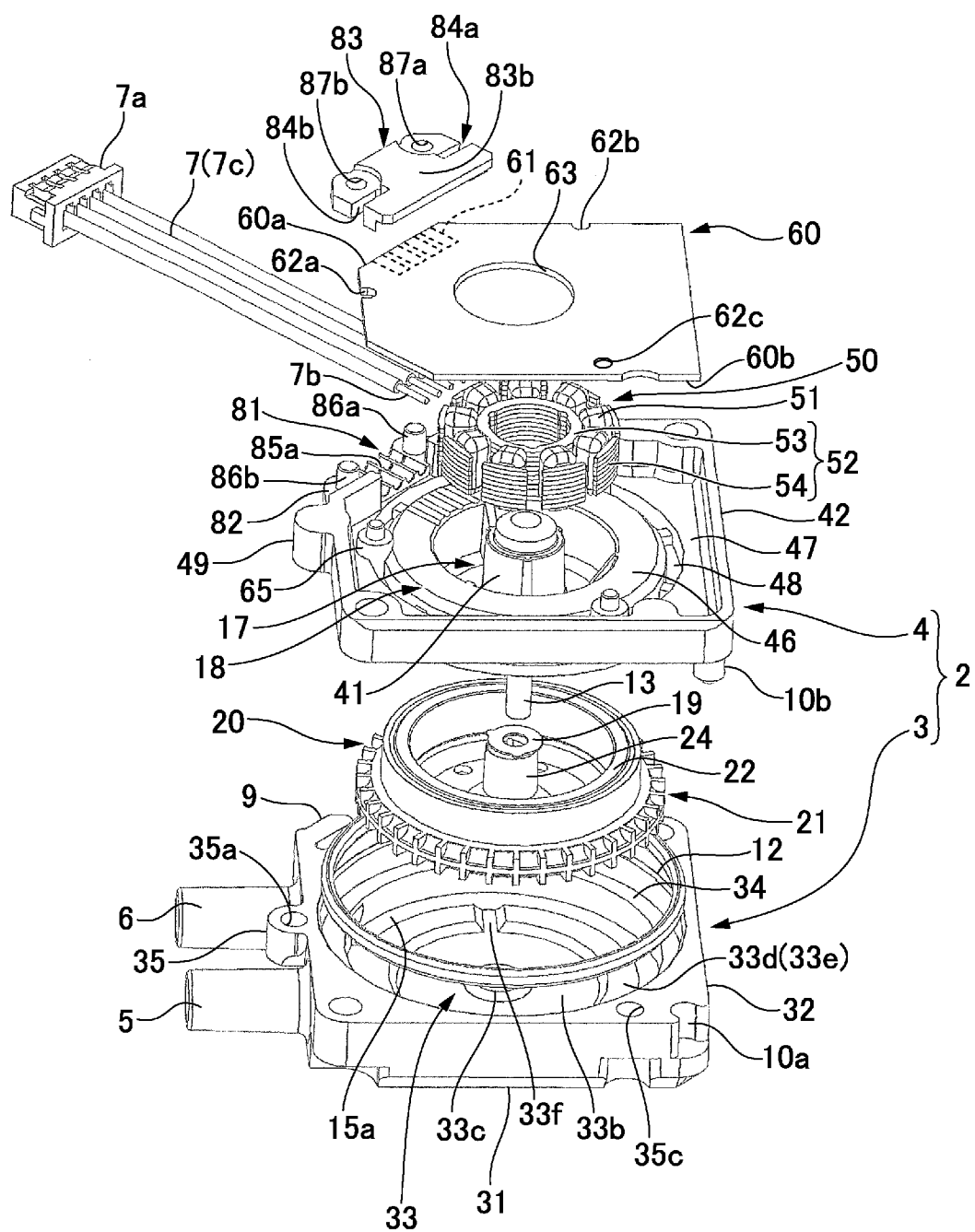
FIG. 3 is an exploded perspective view showing a vortex pump device in accordance with an embodiment of the present invention.
Figure 5A:
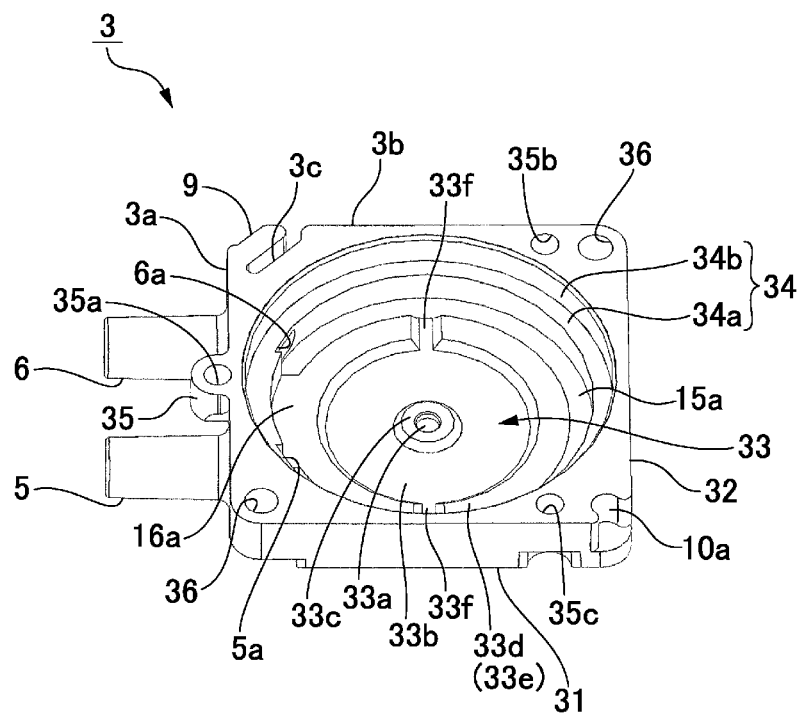
FIGS. 5(*a*) and 5(*b*) are perspective views showing a lower case.

(see FIG. 3 and FIG. 5(a)) for locking the wiring lines 7 drawn out through the wiring outlet part 8. The hook 9 is disposed so as to have a "U"-shaped gap space whose width is slightly smaller than an outer diameter of the wiring line 7 between the hook 9 and the inclined face 3c (see FIG. 5(a)) formed by cutting out a tip end of the corner part of the lower case 3 at an obliquely 45 degrees. The hook 9 is extended with a constant width from the front face 3a side to a side of the side face 3b of the lower case 3. Further, the hook 9 is not protruded to an outer side from a region formed by extending the front face 3a and the side face 3b of the lower case 3.

Further, a corner portion on a rear right side of the pump case 2 which is located at a position diagonal to the wiring outlet part 8 is provided with a turning prevention mechanism 10 for preventing relative turning of the lower case 3 to the upper case 4 when the lower case 3 and the upper case 4 are superposed on each other.

Figure 2A:
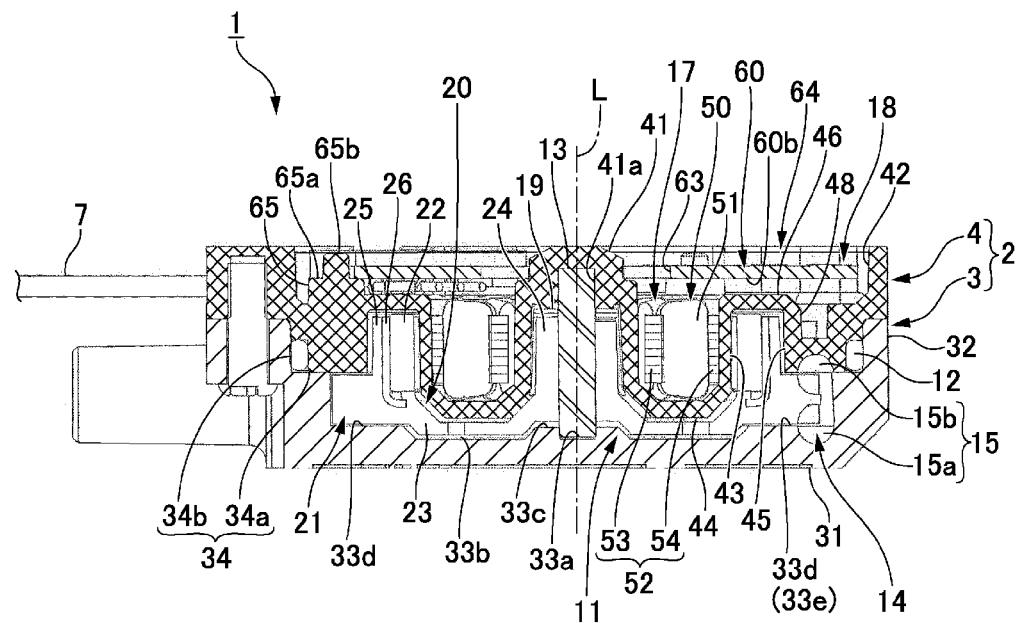
FIGS. 2(*a*) and 2(*b*) are cross-sectional views showing a vortex pump device in accordance with an embodiment of the present invention.
Figure 2B:
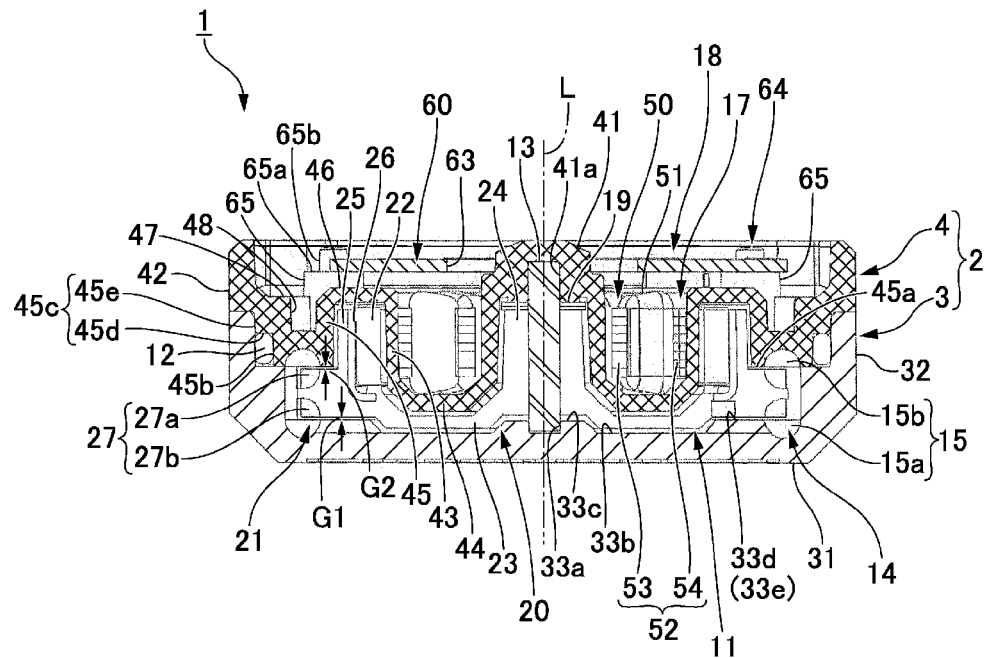
Figure 4A:
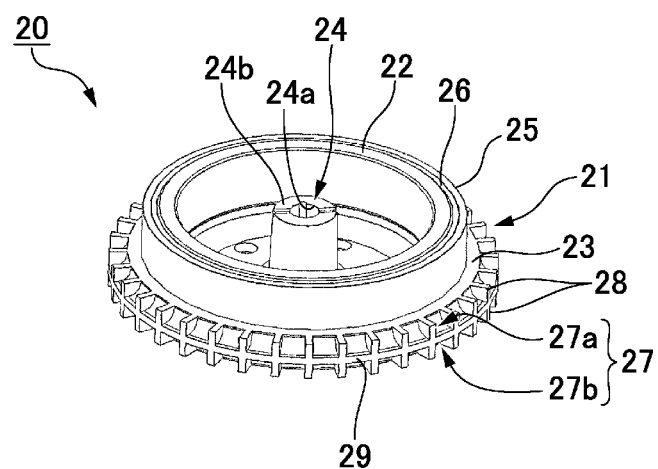
FIG. 4(*a*) is a perspective view showing a rotor and FIG. 4(*b*) is a perspective view showing a stator.
Figure 4B:
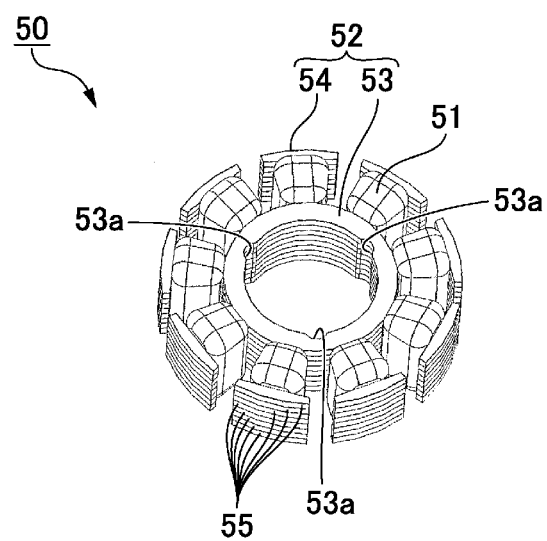

FIG. 2(a) is a longitudinal sectional view showing the vortex pump device 1 which is cut by the "X-X" line in FIG. 1(a) and FIG. 2(b) is a longitudinal sectional view showing the vortex pump device 1 which is cut by the "Y-Y" line in FIG. 1(a). Both of the "X-X" line and the "Y-Y" line are passed through a center axial line "L" of a stator 50. FIG. 3 is an exploded perspective view showing the vortex pump device 1. FIG. 4(a) is a perspective view showing a rotor 20 and FIG. 4(b) is a perspective view showing a stator 50. As shown in FIGS. 2(a) and 2(b) and FIG. 3, the lower case 3 and the upper case 4 are superposed on each other in an upper and lower direction and a partitioned chamber 11 is structured between the lower case 3 and the upper case 4. An O-ring 12 is disposed between the lower case 3 and the upper case 4 for preventing leakage of fluid from the partitioned chamber 11 and the O-ring 12 seals so that fluid in the partitioned chamber 11 is not in communication with the outside of the vortex pump device 1 except the suction pipe 5 and the discharge pipe 6.

A rotor 20 provided with a disk-shaped impeller 21 and a drive magnet 22 and a support shaft 13 which rotatably supports the rotor 20 are disposed in the partitioned chamber 11. The support shaft 13 is made of stainless steel and its upper end portion is press-fitted and fixed to a support shaft fixing recessed part 41a disposed at a center of a bottom part of a center protruded part 41 in a bottomed tube-like shape which is provided at a center portion of the upper case 4. A lower end portion of the support shaft 13 is fixed to a support shaft fixing recessed part 33a provided in the lower case 3. An outer peripheral side portion of the partitioned chamber 11 is structured as a ring shaped pump chamber 14 and the impeller 21 is disposed in the pump chamber 14. The stator 50 provided with a drive coil 51 and a stator core 52 around which the drive coil 51 is wound is disposed on an upper side of the upper case 4, in other words, on an opposite side to the partitioned chamber 11. The drive magnet 22 and the drive coil 51 structure a magnetic drive mechanism for rotationally driving the impeller 21.

A liquid flow passage 15 is formed on a bottom face and a ceiling face of the pump chamber 14 over a predetermined angular range around the axial line. More specifically, a lower side liquid flow passage 15a formed of a circular arc groove having the same semicircular cross-sectional shape is formed on the bottom face of the pump chamber 14 which is structured of the lower case 3, and an upper side liquid flow passage 15b formed of a circular arc groove having the same semicircular cross-sectional shape is formed on the ceiling face of the pump chamber 14 which is structured of the upper case 4. The lower side liquid flow passage 15a and the upper side liquid flow passage 15b are formed in a "C"-shaped circular arc with the center axial line "L" of the stator 50 as a center and are superposed on each other when viewed in the axial line direction. In this embodiment, the liquid flow passage 15 is formed over an angular range approximately larger than 270° around the axial line.

In the pump chamber 14, a suction port 5a which is in communication with the suction pipe 5 is provided at a portion of the lower case 3 where one end of the liquid flow passage 15 is located and a discharge port 6a which is in communication with the discharge pipe 6 is provided at a portion of the lower case 3 where the other end of the liquid flow passage 15 is located (see FIG. 5(a)). A portion of the bottom face of the pump chamber 14 which is located between the suction port 5a and the discharge port 6a is formed as a lower side blocking part 16a where the lower side liquid flow passage 15a is not formed (see FIG. 5(a)). Similarly, a portion of the ceiling face of the pump chamber 14 which is located between the suction port 5a and the discharge port 6a is formed as an upper side blocking part 16b where the upper side liquid flow passage 15b is not provided (see FIG. 6(b)).

The rotor 20 is provided with, as shown in FIG. 4(a), a disk part 23, a bearing part 24 in a cylindrical tube shape which is protruded upward from a center of an upper face of the disk part 24, and a cylindrical tube part 25 which is protruded upward from the upper face of the disk part 23 so as to coaxially surround the bearing part 41 with a predetermined distance from the bearing part 41 between which a stator accommodating chamber 17 described below is capable of being inserted. The rotor 20 is rotatable around the axial line of the support shaft 13 in a state that the support shaft 13 is inserted into a center hole 24a of the bearing part 24 and the bearing part 24 is disposed on an inner side of the center protruded part 41 of the upper case 4. In addition, the center hole 24a of the bearing part 24 functions as a radial bearing for the support shaft 13. One piece or plural pieces of washer 19 is disposed between the bearing part 24 of the rotor 20 and a bottom part of the center protruded part 41 of the upper case 4. The position of the rotor 20 in the axial line direction is adjustable by fitting of the washer 19. For example, when one or two pieces of a washer 19 whose thickness is 0.2 mm and a washer 19 whose thickness is 0.3 mm are selected, a total thickness of the washers 19 can be adjusted in a range from 0.2 mm to 0.6 mm with an interval of 0.1 mm.

A yoke 26 in a cylindrical tube shape is held by an inner peripheral face of the cylindrical tube part 25 and the drive magnet 22 in a cylindrical tube shape is held by an inner peripheral face of the yoke 26. The disk part 23, the bearing part 24 and the cylindrical tube part 25 are structured of resin such as PPS and the yoke 26 is integrally formed with the disk part 23, the bearing part 24 and the cylindrical tube part 25 by insert molding. The drive magnet 22 is adhesively fixed to the inner peripheral face of the yoke 26. An outer peripheral portion on an outer peripheral side in the disk part 23 with respect to the cylindrical tube part 25 is structured as the impeller 21.

An outer peripheral portion of the impeller 21 is formed with recessed parts 27 which are formed in two rows in the upper and lower direction at an equal angular interval in the circumferential direction. The recessed parts 27 are provided with upper side recessed parts 27a, which are formed by cutting an upper side of a circumferential edge of the disk part 23 in a circular arc shape, and lower side recessed parts 27b which are formed by cutting a lower side of a circumferential edge of the disk part 23 in a circular arc shape. Portions between the recessed parts 27 adjacent to each other in the circumferential direction are formed as blades 28 which are respectively extended in a radial direction. A portion between the upper side recessed parts 27a and the lower side recessed parts 27b which are adjacent to each other in the upper and lower direction is extended in the circumferential direction and is formed to be a rib 29 partitioning the respective blades 28 in the upper and lower direction. The impeller 21 is, as shown in FIGS. 2(a) and 2(b), inserted into the pump chamber 14. In this embodiment, a cross sectional shape of the recessed part 27 passing through the center axial line "L" is a circular shape (¼ of a circle) with the upper end and the lower end of the circumferential edge of the disk part 23 as a center.

The stator accommodating chamber 17 which is partitioned by the upper case 4 from the partitioned chamber 11 is formed on an upper side of the upper case 4. In other words, the partitioned chamber 11 and the stator accommodating chamber 17 are separated from each other by the upper case 4 and thus fluid in the partitioned chamber 11 does not leak out to the stator accommodating chamber 17 and a potting agent 64 described below does not leak out to the partitioned chamber 11 from the stator accommodating chamber 17. The stator accommodating chamber 17 is a ring-shaped recessed part which is provided on an outer peripheral side of the center protruded part 41. The drive coil 51 and the stator core 52 of the stator 50 are disposed in the inside of the stator accommodating chamber 17. The stator core 52 is provided with a ring-shaped part 53 on its center side and a plurality of salient poles 54 which is protruded from the ring-shaped part 53 to an outer side in the radial direction and the drive coil 51 is wound around each of a plurality of the salient poles 54. Each of the salient poles 54 faces the drive magnet 22 of the rotor 20 disposed in the partitioned chamber 11 in a direction perpendicular to the axial line through the upper case 4. In this embodiment, the upper case 4 is disposed between the rotor 20 and the stator 50 to be functioned as a partition wall separating the pump chamber 14 from the stator 50.

The stator core 52 is, as shown in FIG. 4(b), structured so that a plurality of plate-shaped core pieces 52 having the same shape which are formed by die cutting a thin plate-shaped magnetic steel plate is laminated in the upper and lower direction (in other words, the axial line direction of the rotor 20 and the stator 50). An inner peripheral face of the ring-shaped part 53 of the stator core 52 is formed with three recessed parts 53a whose cross-sectional shape in a direction perpendicular to the axial line is a semicircular shape at an equal angular interval around the axial line. Three recessed parts 53a are the same shape as each other and are extended in the axial line direction so as to be superposed on each other. The depths in the radial direction of the respective recessed parts 53a are the same as each other and their cross-sectional shapes are the same as each other at each position in the axial line "L" direction.

In this embodiment, an outer peripheral face of the center protruded part 41 of the upper case 4 is formed with three stator core fixing protruding parts 41b which are protruded to outer sides in the radial direction from parts in the circumferential direction. The stator core 52 is fixed to the center protruded part 41 by press-fitting the stator core fixing protruding parts 41b to the recessed parts 53a of the ring-shaped part 53. More specifically, the cross-sectional shape perpendicular to the axial line of three stator core fixing protruding parts 41b formed on the outer peripheral face of the center protruded part 41 is a semicircular shape and three stator core fixing protruding parts 41b are formed at an equal angular interval around the axial line of the support shaft 13. Further, the three stator core fixing protruding parts 41b are provided with the same shape as each other and each of the stator core fixing protruding parts 41b is provided with a tapered face whose protruding amount to an outer side in the radial direction and to the circumferential direction is increased from a side of the bottom part (upper side) toward a side of the opening end (lower side). The stator core 52 is inserted into the stator accommodating chamber 17 in a state that the stator core fixing protruded parts 41b are fitted to the recessed parts 53a of the ring-shaped part 53 and, after that, the lower end portions of the stator core fixing protruded parts 85 are press-fitted to the recessed parts 53a of the ring-shaped part 53 and thereby the stator core 52 is fixed to the upper case 4. In this embodiment, the stator 29 is positioned and fixed in a state that the lower end portions 85b of the stator fixing protruded parts 85 are press-fitted to the inner side recessed parts 53 of the ring-shaped part 50 of one piece of the plate-shaped core piece 52 structuring the stator core 28. In this embodiment, a diameter on an inner side of the ring-shaped part 53 of the stator core 52 is larger than that of the center protruded part 41 and thus, a gap space is structured between the inner side of the ring-shaped part 53 and the center protruded part 41 except the portions of the stator core fixing protruding parts 41b. Further, a curvature of the recessed part 53a of the ring-shaped part 53 of the stator core 52 is larger than that of the lower end portion of the stator core fixing protruding part 41b and thus only a tip end part of the lower end portion of the stator core fixing protruding part 41b is press-fitted to the bottom part of the recessed part 53a of the ring-shaped part 53. In other words, a gap space is formed between the side faces in the circumferential direction of the lower end portion of the stator core fixing protruding part 41b and the recessed part 53a.

Further, as shown in FIGS. 2(a) and 2(b) and FIG. 3, the upper end of the upper case 4 is formed with a frame-shaped outer peripheral wall 42 which is protruded upward along its outer circumferential edge. The outer peripheral wall 42 is extended to an upper side with respect to the stator accommodating position in the stator accommodating chamber 17 and an upper space 18 located on an upper side of the stator accommodating chamber 17 is secured on an inner side of the outer peripheral wall 42. In this embodiment, the upper side end face of the outer peripheral wall 42 is set to be the highest so that the upper side end face is utilized as an abutting face when the vortex pump device 1 is attached to a main apparatus as described below. A base plate 60 is fixed in the upper space 18 in a state that the drive coil 51 and the stator core 52 of the stator 50 disposed in the stator accommodating chamber 17 are covered by the base plate 60 from the upper side (overlapped in the axial line direction). A power supply circuit, terminal parts for wiring connection, a position sensing means such as a Hall element for detecting a rotating position of the drive magnet 22 of the rotor 20 and the like are mounted on a rear face 60b of the base plate 60 and the position sensing means is disposed on an upper side of the outer side ring-shaped part 46. End parts (not shown) of a coil wire drawn out from the drive coil 51 of the stator 50 are connected to a front face (face opposite to the rear face 60b) of the base plate 60. End parts of the coil wire are soldered to the terminal parts formed on the front face of the base plate 60 through the pouring hole 63 of the base plate 60 described below. One ends of the wiring lines 7 are connected with an underside face of the base plate 60. The other ends of the wiring lines 7 are drawn out to the outer side of the pump case 2 through the wiring outlet part 8.

The base plate 60 is formed in a substantially hexagonal shape which is formed by cutting right and left corner parts on a pump front face side of a front end portion of a rectangular shape are cut out at obliquely 45 degrees. An oblique side 60a located on a side in the clockwise direction with respect to the front edge of the base plate 60 faces the wiring outlet part 8. The rear face 60b of the base plate 60 is directed to the stator 50 and a portion along the oblique side 60a of the rear face 60b is formed with terminal parts 61 for connecting the wiring lines 7 so as to correspond to the number of the wiring lines 7. In this embodiment, the terminal parts 61 are formed of circuit patterns on the base plate 60 and the wiring lines 7 do not protrude to the front face side (face opposite to the rear face 60b) of the base plate 60. A cut-out portion 62a in a circular arc shape is formed at a front edge of the base plate 60 and a cut-out portion 62b in a circular arc shape is also formed at a position on the rear end side of the side edge of the base plate which is located on a side in the clockwise direction with respect to the front edge. Further, a circular fixing hole 62c is formed at a position on the rear end side along a side edge of the base plate which is located on a side in the counterclockwise direction with respect to the front edge. The pouring hole 63 in a circular shape is formed at a substantially center of the base plate 60. The base plate 60 is, as shown in FIGS. 2(a) and 2(b), disposed so that the center protruded part 41 of the upper case 4 and the center axial line "L" of the stator 50 attached to the center protruded part 41 are coincided with a center of the pouring hole 63 in the upper space 18.

As shown in FIGS. 2(a) and 2(b), a potting agent 64 is poured into the stator accommodating chamber 17 and the upper space 17 of the upper case 4 to a position in the vicinity of the upper end edge of the outer peripheral wall 42 and thus the drive coil 51 and the stator core 52 of the stator 50 and the base plate 60 are buried by the potting agent 64 as a sealing agent. Further, the wiring lines 7 are connected to the underside face of the base plate 60 (rear face 60b) and thus, when the potting agent 64 is poured until the base plate 60 is buried, connection parts of the wiring lines 7 with the base plate 60 (portion of the lead line 7b which is not covered with insulation coating 7c) is also buried by the potting agent 64. The potting agent 64 is resin having insulation property such as epoxy, acrylic, or silicon resin. The pouring hole 63 formed in the base plate 60 has a large diameter with respect to a portion of the center protruded part 41 located at the same height as the base plate 60 and thus a gap space is formed between an inner peripheral face of the pouring hole 63 and the center protruded part 41. The potting agent 64 is poured onto the stator 50 through the gap space and filled in the stator accommodating chamber 17. The potting agent 64 is poured to a height at which the base plate 60 disposed in the upper space 18 is buried. In this embodiment, the potting agent is flowed into a gap space structured between an inner side of the ring-shaped part 53 of the stator core 52 and the center protruded part 41.

It is preferable that thermosetting resin such as epoxy resin or silicon resin is used as the potting agent 64. In a case that a low-viscosity potting agent 64 is used in order that the potting agent 64 is easily flowed into the gap space structured between the inner side of the ring-shaped part 53 of the stator core 52 and the center protruded part 41, when a gap space is existed between the wiring outlet port 81 and a fixing member 83 as described below, the potting agent 64 may be leaked out from the upper space 18. However, when the potting agent 64 made of thermosetting resin is used, the potting agent 64 can be cured promptly and thus an amount of the potting agent 64 leaked out from the upper space 18 is reduced. In a case that the fixing member 83 is structured of material which transmits light, photo-curable resin which is cured by irradiating light such as ultraviolet rays to the potting agent 64 may be used.

As described above, the wiring lines 7 are connected with the drive coil 51 through the base plate 60. When an exciting current is supplied to the drive coil 51 through the wiring lines 7 and the base plate 60, the rotor 20 is rotated around the axial line. As a result, liquid is sucked into the pump chamber 14 through the suction pipe 5, pressurized in the pump chamber 14 and then discharged from the discharge pipe 6. The motor (rotor 20, stator 50 and base plate 60) which drives the vortex pump device 1 in this embodiment is a three-phase brushless motor and three Hall elements not shown for detecting a position of the drive magnet 22 of the rotor 20 are disposed on the rear face 60b of the base plate 60. When the order of an exciting current supplied from a drive and control device of the base plate 60 to the drive coil 51 is reversed, the rotor 20 is rotated in the reverse direction and thus, liquid is sucked through the discharge pipe 6, pressurized in the pump chamber 14 and then discharged from the suction pipe 5.

(Lower Case)

Figure 5B:
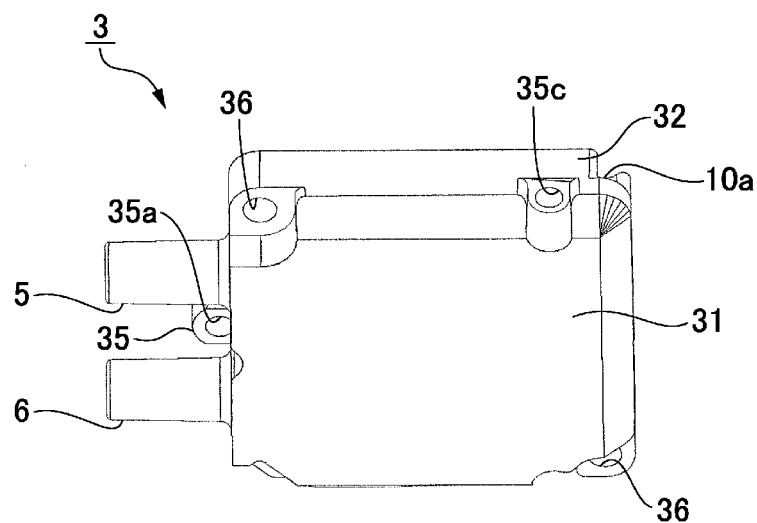

FIG. 5(a) is a perspective view showing the lower case 3 which is viewed from an upper right side and FIG. 5(b) is a perspective view showing the lower case 3 which is viewed from a lower right side. The lower case 3 is provided with a bottom plate part 31, a ring shaped side wall part 32 which is stood up from an outer peripheral side portion of the bottom plate part 31 so as to extend to an upper side, and a circular recessed part 33 which is formed by the bottom plate part 31 and the side wall part 32. The pump chamber 14 is structured to be a ring shape along the circumferential edge of the circular recessed part 33. A support shaft fixing recessed part 33a is provided at the center of a circular bottom face of the circular recessed part 33. A contour shape of the side wall part 32 is a substantially rectangular shape and a planar shape of the lower case 3 viewed in the axial line direction is a substantially rectangular shape. In this embodiment, when the vortex pump device 1 is assembled, the bottom plate part 31 and an upper end face of the outer peripheral wall 42 of the upper case 4 are parallel to each other. Therefore, when the bottom plate part 31 is installed to be horizontal, the upper end face of the outer peripheral wall 42 is also set to be horizontal. Further, a width from the bottom plate part 31 to the upper end face of the outer peripheral wall 42 of the upper case 4 is a dimension in the axial line direction of the vortex pump device 1.

A ring-shaped recessed part 33b is formed on an outer peripheral side of the support shaft fixing recessed part 33a coaxially with the support shaft fixing recessed part 33a. A portion between the support shaft fixing recessed part 33a and the ring-shaped recessed part 33b is formed to be an inner side ring-shaped protruded part 33c and a portion on an outer peripheral side of the ring-shaped recessed part 33b is formed to be an outer side ring-shaped protruded part 33d. The outer side ring-shaped protruded part 33d is formed with the lower side liquid flow passage 15a structuring a bottom face of the pump chamber 14 and a lower side blocking part 16a along its circumferential edge. A ring-shaped end face portion 33e of the outer side ring-shaped protruded part 33d which is adjacent to the inner side of the pump chamber 14 faces the disk part 23 of the rotor 20 which is disposed within the partitioned chamber 11 through a minute gap "G1" (see FIGS. 2(a) and 2(b)). In the ring-shaped end face portion 33e, two grooves 33f having a constant width by which the lower side liquid flow passage 15a is in communication with the ring-shaped recessed part 33b are formed at positions separated from each other by 180°. When the vortex pump device 1 is driven, a part of fluid is flowed from the groove 33f which is near to the discharge pipe 6 to the groove 33f which is near to the suction pipe 5 through the ring-shaped recessed part 33b. When fluid is liquid such as water, gas such as air in the inside of the outer side ring-shaped protruded part 33d is discharged to the discharge pipe 6 through the lower side liquid flow passage 15a. Therefore, the liquid is entered between the support shaft 13 and the center hole 24a and thus contacting of the support shaft 13 with the center hole 24a is reduced and abrasion of the support shaft 13 and the center hole 24a can be reduced.

A stepped part 34 is provided on an inner peripheral face of an upper side portion of the side wall part 32. The stepped part 34 is provided with a ring-shaped end face 34a, which is extended in a radial direction from a midway position in the axial line direction of the inner peripheral face of the side wall part 32, and a circular inner peripheral face 34b which is extended in a cylindrical shape to an upper side from an outer circumferential edge of the ring-shaped end face 34a. The stepped part 34 forms a circular recessed part having a diameter larger than the circular recessed part 33 on an upper end portion of the lower case 3.

The suction pipe 5 and the discharge pipe 6 are protruded in parallel from the front face of the side wall part 32. The inclined face 3c and the hook 9 are provided at the corner portion on a front left side of the side wall part 32 of the lower case 3 which is adjacent to the discharge pipe 6. The turning prevention recessed part 10a structuring the turning prevention mechanism 10 is provided at a rear right side corner portion located at a diagonal position to the corner portion provided with the inclined face 3c and the hook 9. The turning prevention recessed part 10a is a recessed part which is recessed to a lower side from the upper end face of the side wall part 32. Further, the turning prevention recessed part 10a is cut out from the outer peripheral side and its inner peripheral face is exposed to the outer side of the lower case 3.

A lower case fixing part 35 protruding forward is provided on the front face of the side wall part 32 between the suction pipe 5 and the discharge pipe 6. The lower case fixing part 35 is provided with a first case fixing screw hole 35a which penetrates in the axial line direction. Further, a second case fixing screw hole 35b penetrating in the axial line direction and a third case fixing screw hole 35c penetrating in the axial line direction are provided at a rear right side corner portion and a rear left side corner portion located on an opposite side to the first case fixing screw hole 35a with respect to the axial line in the front and rear direction of the device. The third case fixing screw hole 35c is located on the front side with respect to the turning prevention recessed part 10a.

(Upper Case)

Figure 6A:
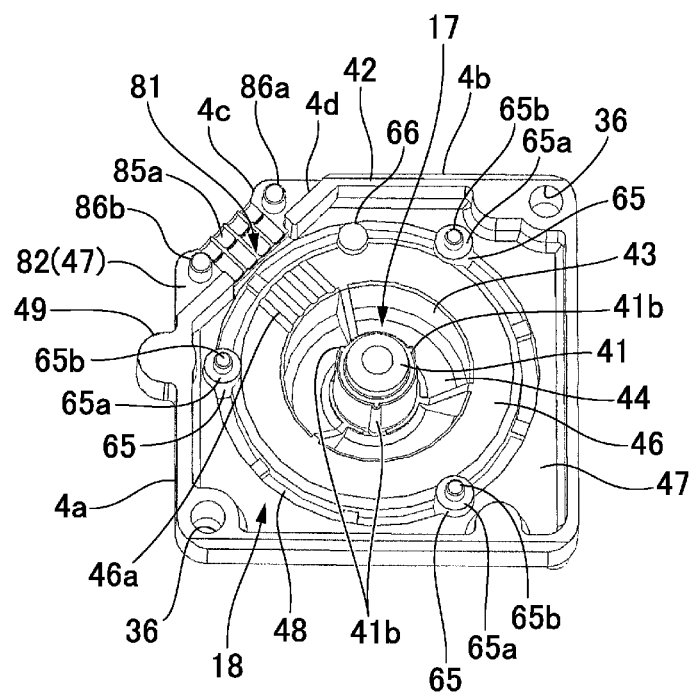
FIGS. 6(*a*) and 6(*b*) are perspective views showing an upper case.
Figure 6B:
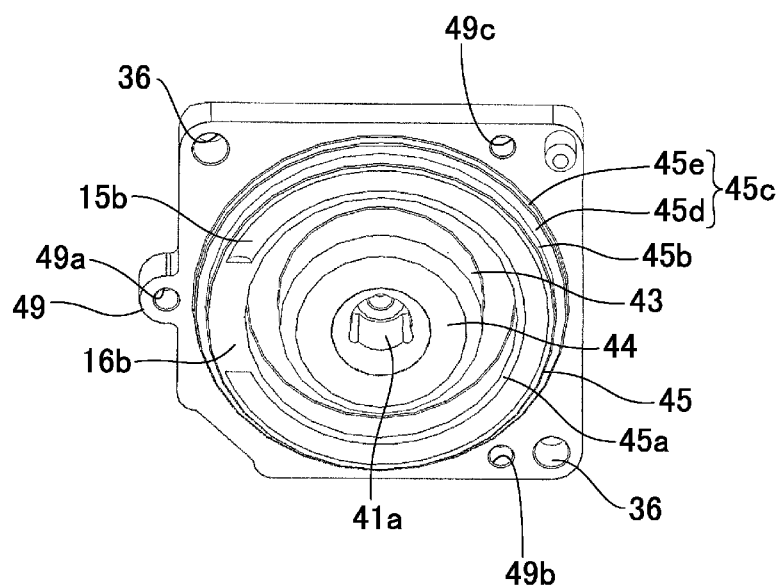

FIG. 6(a) is a perspective view showing the upper case 4 which is viewed from an upper right side and FIG. 6(b) is a perspective view showing the upper case 4 which is viewed from a lower right side. A planar shape of the upper case 4 when viewed in the axial line direction is a roughly rectangular shape. The upper case 4 is provided with a center protruded part 41 which is provided at its center portion, a cylindrical tube part 43, which is coaxially structured so as to surround the center protruded part 41, and an inner side ring-shaped part 44 which connects a lower end part of the center protruded part 41, in other words, an opening end part of the support shaft fixing recessed part 41a with a lower end part of the cylindrical tube part 43. Further, the upper case 4 is provided with a ring-shaped protruded part 45, which is coaxially structured with the center protruded part 41 on an outer peripheral side of the cylindrical tube part 43 and is protruded to a lower side, an outer side ring-shaped part 46, which connects an upper end of the cylindrical tube part 43 with an upper end of the ring-shaped protruded part 45, and a projecting part 47 which projects from the upper end of the ring-shaped protruded part 45 to an outer peripheral side.

A ring-shaped groove 48 is formed between the outer side ring-shaped part 46 and the projecting part 47. Base plate support parts 65 and 66 are protruded upward from the annular groove 48. The base plate support part 65 is formed at three positions at an equal angular interval in the circumferential direction. The base plate support part 65 is formed with a ring-shaped support face 65a, which is directed upward and is located on an upper side with respect to the outer side ring-shaped part 46 and the projecting part 47, and a projection 65b protruding upward from a center of the ring-shaped support face 65a. The base plate support part 66 is formed at only one position which is slightly shifted in the clockwise direction from the front of the wiring outlet part 8. A tip end face of the base plate support part 66 is formed in a flat face having the same height as the ring-shaped support face 65a. The base plate 60 is placed on the ring-shaped support faces 65a of the base plate support parts 65 and the tip end face of the base plate support part 66 and is supported at a lower position with respect to the upper end of the outer peripheral wall 42. Further, the projections 65b protruding from the tip ends of the respective base plate support parts 65 are inserted into the cut-out portions 62a and 62b and the fixing hole 62c and thereby the base plate 60 is positioned so that the center protruded part 41 of the upper case 4 and the stator 50 mounted on the center protruded part 41 and the pouring hole 63 are coaxially disposed with each other. After the base plate 60 is positioned, the projections 65b are thermally welded and the base plate 60 is fixed.

The stator accommodating chamber 17 is structured of faces of the center protruded part 41, the cylindrical tube part 43 and the inner side ring-shaped part 44 on an opposite side with respect to the lower case 3. The center protruded part 41 is provided with a height dimension so as to be protruded to an upper side with respect to the stator core 52 disposed in the stator accommodating chamber 17 and the base plate 60 and located to be slightly lower than the outer peripheral wall 42. The upper space 18 is structured in the upper part of the stator accommodating chamber 17 so as to be surrounded by the outer side ring-shaped part 46, the ring-shaped groove 48, the projecting part 47, the outer peripheral wall 42 and the fixing member 83. The stator accommodating chamber 17 and the upper space 18 are a continuous space and are partitioned from the partitioned chamber 11 by the upper case 4.

As shown in FIG. 6(b), a lower end face of the ring-shaped protruded part 45 is formed with an upper side liquid flow passage 15b and an upper side blocking part 16b, which structures a ceiling face of the pump chamber 14, at a midway position in the radial direction. In the lower end face of the ring-shaped protruded part 45, a ring-shaped end face portion 45a which is adjacent to an inner side of the pump chamber 14 faces the disk portion of the rotor 20 disposed within the partitioned chamber 11 through a minute gap "G2" (see FIGS. 2(a) and 2(b)2).

A circular outer peripheral face 45b in a cylindrical shape is provided on an outer peripheral side of the ring-shaped end face portion 45a of the ring-shaped protruded part 45 to an upper side from an outer circumferential edge of the ring-shaped end face portion 45a. A radial direction protruded part 45c protruding to an outer side by a predetermined dimension in the radial direction is provided on an upper part of the circular outer peripheral face 45b. The radial direction protruded part 45c is provided with a ring-shaped end face 45d, which is extended to an outer side in the radial direction from a midway position in the axial line direction of the ring-shaped protruded part 45 so as to face the lower case 3, and a circular outer peripheral face 45e which is extended to an upper side from an outer circumferential edge of the ring-shaped end face 45d so as to face the outer side in the radial direction.

A contour shape of the projecting part 47 is a roughly rectangular shape and the corner portion on the front left side is cut out obliquely to form the inclined face 4c. The outer peripheral wall 42 is protruded to the upper side from an outer circumferential edge of the projecting part 47 except the corner part where the wiring outlet part 8 is provided. On the other hand, the outer peripheral wall 42 is provided at a setback position to an inner side from the inclined face 4c at the corner part where the wiring outlet part 8 is provided. The outer peripheral wall 42 forms an upper part of the side face of the pump case 2 and the setback portion is further retreated from the inclined face 4c formed at the tip end of the projecting part 47 to form an inclined face 4d which is parallel to the inclined face 4c (see FIGS. 1(*a*) and 1(*c*) and FIG. 6(*a*)).

The projecting part 47 is provided with a flat lower end face. The turning preventing protruding part 10b which structures the turning prevention mechanism 10 together with the turning prevention recessed part 10a is protruded to a lower side from the corner portion on the rear right side of the projecting part 47. An outer circumferential edge of a tip end of the turning preventing protruding part 10b is chamfered. In this embodiment, a position of the tip end face (lower end face) of the turning preventing protruding part 10b is set to be the same position as the ring-shaped end face 45a of the ring-shaped protruded part 45 in the axial line direction. Further, a protruding dimension of the turning preventing protruding part 10b is set to be shorter than a depth dimension of the turning prevention recessed part 10a. In addition, when the turning preventing protruding part 10b is fitted to the turning prevention recessed part 10a, the turning preventing protruding part 10b is abutted with the inner peripheral face, specifically, the side face of the turning prevention recessed part 10a in the circumferential direction around the axial line without a gap space and, in the radial direction with the axial line as a center, a gap space is formed between the peripheral face of the turning prevention recessed part 10a and the turning preventing protruding part 10b.

The upper side case fixing part 49 structured of a protruding part protruding to the front side is provided at a center of the front face of the projecting part 47 in the widthwise direction of the device. A first case fixing screw hole 49a extending in the axial line direction is provided in the upper side case fixing part 49. Further, a second case fixing screw hole 49b penetrating in the axial line direction and a third case fixing screw hole 49c penetrating in the axial line direction are provided at a rear right side corner portion and a rear left side corner portion located on an opposite side to the first case fixing screw hole 49a with respect to the axial line in the front and rear direction of the device. The third case fixing screw hole 49c is located on the front side with respect to the turning preventing protruding part 10b.

(Partitioning of Pump Chamber)

When the pump chamber 14 (partitioned chamber 11) is to be partitioned, an O-ring 12 is mounted on the circular outer peripheral face 45b of the ring-shaped protruded part 45 of the upper case 4. In this case, a lubricant is applied to the O-ring 12. After that, the ring-shaped protruded part 45 of the upper case 4 is inserted into the inner side of the circular inner peripheral face 34b of the lower case 3. In this embodiment, the tip end of the turning preventing protruding part 10b of the turning prevention mechanism 10 is set to be at the same position as the ring-shaped end face portion 45a of the ring-shaped protruded part 45 in the axial line direction. Therefore, when the ring-shaped protruded part 45 is inserted into the inner side of the circular inner peripheral face 34b, the turning preventing protruding part 10b is simultaneously inserted into the turning prevention recessed part 10a which is provided in the lower case 3.

After that, the upper case 4 and the lower case 3 are relatively come close to each other so that the lower end face of the ring-shaped protruded part 45 (ring-shaped end face portion which is located on the outer peripheral side with respect to the upper side liquid flow passage 15b and the upper side blocking part 16b) is abutted with the ring-shaped end face 34a of the stepped part 34 of the lower case 3. As a result, the circular outer peripheral face 45b of the ring-shaped protruded part 45 of the upper case 4 is abutted with the circular inner peripheral face 34b of the stepped part 34 of the lower case 3 and thus the upper case 4 is positioned in the radial direction by the lower case 3. Further, the O-ring 12 is crushed in the radial direction between the circular outer peripheral face 45b of the upper case 4 and the circular inner peripheral face 34b of the lower case 3 in a sandwiched state between the stepped part 34 of the lower case 3 and the ring-shaped protruded part 45 of the upper case 4. As a result, the leakage of liquid from the partitioned chamber 11 is prevented.

After that, the upper case 4 and the lower case 3 are fixed to each other by three headed screws which penetrate through the first through third case fixing through holes 35a through 35c provided in the lower case 3 and are threadedly engaged with the first through third case fixing screw holes 49a through 49c provided in the upper case 4. In a state that the pump chamber 14 is partitioned, a gap space is formed between the tip end part of the turning preventing protruding part 10b, which is fitted to the turning prevention recessed part 10a, and the bottom face of the turning prevention recessed part 10a.

In this embodiment, when the pump chamber 14 (partitioned chamber 11) is to be partitioned, the support shaft 13 is previously fixed to the support shaft fixing recessed part 41a of the upper case 4. Further, the rotor 20 is disposed in the ring-shaped recessed part 33b of the lower case 3 so that the support shaft 13 is capable of being inserted into the bearing part 24. When the upper case 4 is superposed on the lower case 3 to form the pump chamber 14 (partitioned chamber 11) in a partitioned state, the lower end of the support shaft 13 is inserted into the recessed part 53a of the lower case 3 and the position in the radial direction of the support shaft 13 is fixed and the support shaft 13 and the center protruded part 41 are set to be in a coaxial state. Therefore, the stator 50 and the rotor 20 are coaxially disposed with each other and the salient poles 54 around which the drive coil 51 is wound in the stator core 52 face the drive magnet 22 of the rotor 20 disposed in the partitioned chamber 11 through the cylindrical tube part 43 of the upper case 4.

In this embodiment, as shown in FIGS. 2(*a*) and 2(*b*), one or plural washers 43 are fitted between the upper end face 24b of the bearing part 24 of the rotor 20 and the bottom part of the center protruded part 41 (bottom part of the support shaft fixing recessed part 41a) and thereby the magnetic center position in the axial line direction of the drive magnet 22 is shifted to a lower side with respect to the magnetic center position in the axial line direction of the stator core 52. As a result, the rotor 20 is urged upward (to the support shaft fixing recessed part 41a side) by a magnetic attraction force acted between the stator core 52 and the drive magnet 22.

(Wiring Outlet Part)

A wiring outlet part 8 is, as shown in FIG. 3, formed at a corner part of a side face portion of the pump case 2. The wiring outlet part 8 is provided with a wiring outlet port 81, which is formed by cutting out a portion of the outer peripheral wall 42 forming the inclined face 4d in the corner part, a wire placing part 82 for arranging and placing the wiring lines 7 drawn out from the inner side of the pump case 2 to the outer side in one row through the wiring outlet port 81, and a fixing member 83 which is attached so as to close the wiring outlet port 81 from the upper side of the base plate 60 and the wiring lines 7. As shown in FIG. 1(*a*), the fixing member 83 sandwiches the wiring lines 7 arranged on the wire placing part 82 by its front end portion between the wire placing part 82 and the fixing member 83 and the fixing member 83 is attached so that the wiring lines 7 are fixed in a pressed state. The fixing member 83 is a resin molded member made of resin such as PPS.

Figure 7:
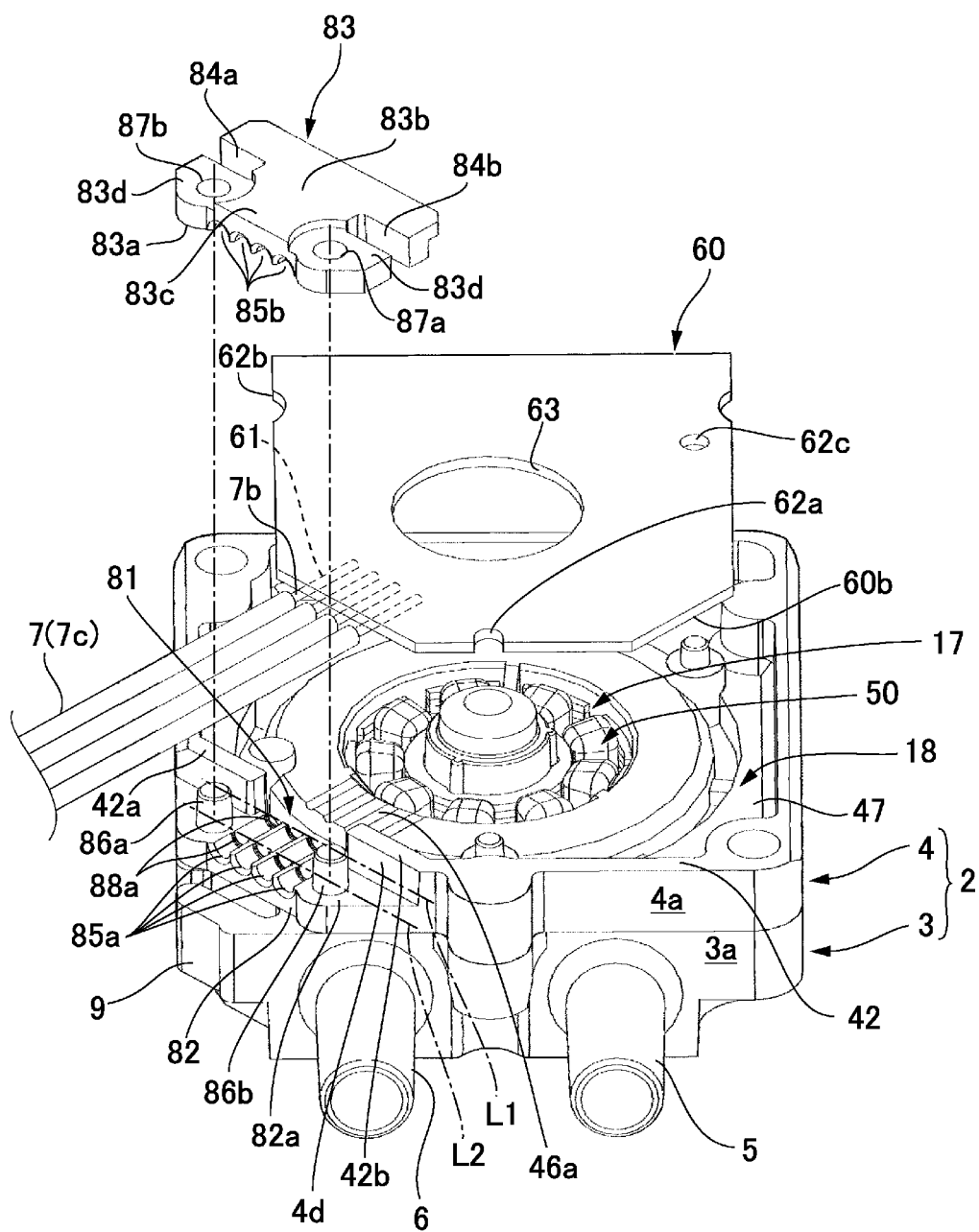
FIG. 7 is an exploded perspective view showing a vortex pump device which is viewed from an upper front face side of the device.

FIG. 7 is an exploded perspective view showing the vortex pump device 1 which is viewed from an upper front face side of the device and in which the wiring lines 7, the base plate 60 and the fixing member 83 are detached from the pump case 2. FIGS. 8(*a*) and 8(*b*) are perspective views showing the fixing member 83. FIG. 8(*a*) is a perspective view showing the fixing member 83 viewed from an upper (upper end face 83*c*) side, and FIG. 8(*b*) is a perspective view showing the fixing member 83 viewed from a lower (lower end face 83*a*) side. As described above, the outer peripheral wall 42 is setback or retreated on an inner side at the corner part located in a clockwise direction side with respect to the front face of the pump case 2 and the corner part of the projecting part 47 is extended to an outer side of the outer peripheral wall 42. The wire placing part 82 is structured by using the extending portion. The wiring outlet port 81 is a rectangular cut-out portion which is formed by cutting out the outer peripheral wall 42 with a constant width from the upper edge and is opened at a center portion of the inclined face 4*d* provided in the upper end of the side face of the pump case 2. End parts 42*a* and 42*b* of the outer peripheral wall 42 are disposed on both sides of the wiring outlet port 81 so as to interpose the wiring outlet port 81. The wiring outlet port 81 is cut out to a position lower than a filling height of the potting agent 64 in the upper space 18.

The fixing member 83 is provided with a planar shape whose width is wider than an opening width of the wiring outlet port 81. A pair of fitting grooves 84*a* and 84*b* is formed on one edge and the other edge in the widthwise direction of the fixing member 83. The fitting grooves 84*a* and 84*b* are formed on the same straight line and are opened so as to direct opposite sides each other. The opening widths of the fitting grooves 84*a* and 84*b* are set to be a dimension which is capable of fitting the end parts 42*a* and 42*b* of the outer peripheral wall 42. A portion between the fitting grooves 84*a* and 84*b* of the fixing member 83 is formed in a narrowed shape. The narrowed portion 83*b* is press-fitted between the end parts 42*a* and 42*b* of the outer peripheral wall 42 and the end parts 42*a* and 42*b* are fitted to the fitting grooves 84*a* and 84*b* and, as a result, the fixing member 83 is attached in a state that the wiring outlet port 81 is closed (see FIG. 1(*a*)). An outer width portion 89*a* is located radially outward of the fitting grooves 84*a*, 84*b*, and an inner width portion 89*b* is located radially inward of the fitting grooves 84*a*, 84*b*.

The fixing member 83 is structured so that, when the fixing member 83 is attached to the wiring outlet port 81, its upper end face is lower than the end face on the upper side of the outer peripheral wall 42 and the fixing member 83 does not protrude to an upper side with respect to the upper end of the outer peripheral wall 42 (see FIGS. 1(*a*) and 1(*c*)). Further, when the fixing member 83 is attached to the wiring outlet port 81, the outer peripheral wall 42 and the fixing member 83 form a frame which continuously surrounds the periphery of the upper space 18. In this embodiment, in consideration of that the end face on the upper side of the outer peripheral wall 42 is utilized as an abutting face (in other words, a mounting face) with a main body member to which the vortex pump device 1 is attached, the height of the upper end face of the fixing member 83 is set as described above. Since the fixing member 83 is set to be lower than the end face on the upper side of the outer peripheral wall 42, the fixing member 83 is not abutted with the main body member and the end face on the upper side of the outer peripheral wall 42 can be tightly contacted with the main body member. Further, the mounting holes 36 are provided at the corner parts on the front right side and the rear left side of the outer peripheral wall 42 for attaching the vortex pump device 1 to the main body member by a screw or the like and the upper end face of the outer peripheral wall 42 surrounds the mounting holes 36. The mounting holes 36 are penetrated through the lower case 3 and the upper case 4.

Figure 9:
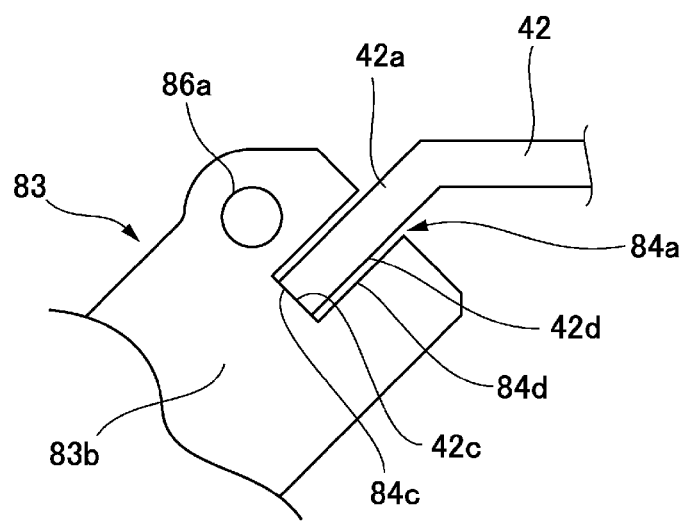
FIG. 9 is an enlarged view showing a part of a wiring outlet part.

FIG. 9 is an enlarged view showing a part of the wiring outlet part 8 and is an enlarged view showing a fitting portion (region "A" in FIG. 1(*a*)) of the fitting groove 84*a* to the end part 42*a* of the outer peripheral wall 42. A groove bottom face 84*c* of the fitting groove 84*a* is pressed against and abutted with a tip end face 42*c* of the end part 42*a* of the outer peripheral wall 42. On the other hand, a slight gap space is formed between a groove side face 84*d* of the fitting groove 84*a* and a surface 42*d* of the outer peripheral wall 42 facing the groove side face 84*d*. In this embodiment, the gap space between the opposing faces functions as a labyrinth structure part. When the labyrinth structure part is provided, a length of a flow passage which is formed in the gap space between the surface 42*d* of the outer peripheral wall 42 and the groove side face 84*d* is set to be long and thus the potting agent 64 is prevented from flowing to the deepest part of the gap space, in other words, to the abutting part of the groove bottom face 84*c* of the fitting groove 84*a* with the tip end face 42*c* of the end part 42*a* of the outer peripheral wall 42. Further, even when the potting agent 64 is flowed to the abutting part of the groove bottom face 84*c* of the fitting groove 84*a* with the tip end face 42*c* of the end part 42*a* of the outer peripheral wall 42, a pressure applied to the potting agent is lowered by the labyrinth structure part. Therefore, the potting agent 64 poured into an inner side space of the outer peripheral wall 42 does not pass the abutting part of the groove bottom face 84*c* of the fitting groove 84*a* with the tip end face 42*c* of the end part 42*a* of the outer peripheral wall 42 and thus the potting agent 64 is not leaked out to the outer side through the abutting part.

Wiring line holding grooves 85*a* in a circular arc shape in cross section extending from the wiring outlet port 81 to the outer peripheral side in a diagonal line direction of the upper case 4 are provided in parallel on an upper face 82*a* of the wire placing part 82 so as to correspond to the number of the wiring lines 7. The wiring line holding groove 85*a* is extended from the wall face center line "L1" connecting the end parts 42*a* and 42*b* of the outer peripheral wall 42 with each other to the tip end of the wire placing part 82. Circular arc grooves 46*a* extended on the extension lines of the wiring line holding grooves 85*a* are formed in parallel on an upper face of the outer side ring-shaped part 46 on an inner side of the outer peripheral wall 42. The wiring line 7 is a flexible lead wire which is structured that a core wire 7*b* formed by binding wire rods structured of an electric conductor such as a copper wire is covered by insulation coating 7*c* structured of insulating material such as resin having resilience. In this embodiment, four wiring lines are provided, in other words, a power supply line, a ground line, and two signal lines for rotation signal and control signal. Each of the wiring lines 7 is structured so that the insulation coating 7*c* of an end part on the connection side with the base plate 60 is removed and the core wire 7*b* is exposed. The core wire 7b is connected with the terminal part 61 which is formed on the rear face 60b of the base plate 60 facing the wiring outlet part 8 by soldering or the like. When the base plate 60 is attached to an upper side of the stator 50, each of the core wires 7b connected with each of the terminal parts 61 is accommodated in each of the circular arc grooves 46a.

FIGS. 10(a), 10(b) and 10(c) are longitudinal sectional views showing parts of the wiring outlet part 8 and the wiring line 7. FIG. 10(a) is a longitudinal sectional view showing a part of the wiring outlet part 8 which is cut by the "Z1-Z1" line in FIG. 1(a), FIG. 10(b) is a longitudinal sectional view showing a part of the wiring outlet part 8 which is cut by the "Z2-Z2" line in FIG. 1(a), and FIG. 10(c) is a longitudinal sectional view showing an end part of the wiring line 7. As shown in FIG. 8(b), a lower end face 83a of the fixing member 83 is formed with wiring line pressing grooves 85b at positions facing the wiring line holding grooves 85a of the wire placing part 82. The wiring line pressing groove 85b is a similar groove in a circular arc shape in cross section to the wiring line holding groove 85a. As shown in FIG. 10(a), when the lower end face 83a of the fixing member 83 is abutted with the upper face 82a of the wire placing part 82, the edge portions of the respective wiring line pressing grooves 85b are abutted with the edge portions of the respective wiring line holding grooves 85a and thus through holes 85 in a circular shape in cross section are formed so as to extend in parallel to the rear face 60b of the base plate 60. When the wiring line 7 is passed through the through hole 85 and is taken out to an outer side from an inner side of the wiring outlet part 8, the wiring line 7 is sandwiched between the wiring line holding groove 85a of the wire placing part 82 and the wiring line pressing groove 85b of the fixing member 83 to be fixed in a state that the insulation coating 7c is pressed.

The wiring line holding groove 85a and the circular arc groove 46a are structured at the same height. Further, in a state that the base plate 60 is placed on the ring-shaped support faces 65a of the base plate support parts 65 and the tip end face of the base plate support part 66, the wiring lines 7 are extended in parallel to the rear face 60b of the base plate 60 and are passed through the through holes 85. Therefore, bending of the wiring line 7 is reduced and thus an attaching force of the fixing member 83 to the wire placing part 82 can be made small.

Further, an upper face 82a of the wire placing part 82 is formed with a pair of positioning projections 86a and 86b protruding upward so as to interpose the wiring line holding grooves 85a. The fixing member 83 is formed with positioning holes 87a and 87b at positions facing the positioning projections 86a an 86b of the wire placing part 82. When the fixing member 83 is to be attached to the wiring outlet port 81, the end parts 42a and 42b of the outer peripheral wall 42 are fitted to the fitting grooves 84a and 84b while the positioning projections 86a and 86b are inserted into the positioning holes 87a and 87b. After the fixing member 83 is attached, the positioning projections 86a and 86b are fixed to the positioning holes 87a and 87b by thermal welding. According to this structure, the fixing member 83 is positioned at the position different from the press-fitting position to the wiring outlet port 81 and thus the inclination of the fixing member 83 (inclination with respect to the wiring line drawing direction) is prevented. Therefore, the wiring line pressing grooves 85b and the wiring line holding grooves 85a are correctly faced each other and thus the circular through holes 85 can be formed surely. Further, the fixing member 83 is fixed by thermal welding to prevent floating of the fixing member 83 and thus a state that the wiring lines 7 are pressed by the fixing member 83 is maintained without using a jig or a pressing member. In addition, since the fixing member 83 is positioned and fixed at a pair of the positions interposing the wire placing part 82, the fixing member 83 can be attached horizontally and the wiring lines can be pressed uniformly. Further, the fixing member 83 is superposed on the base plate 60 on an upper side of the base plate 60 and thus floating of the base plate 60 is prevented by the fixing member 83.

Figure 8A:
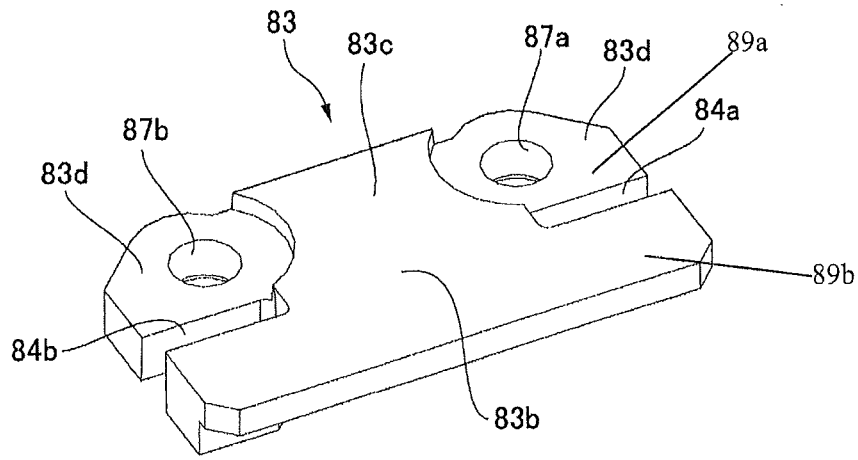
FIGS. 8(*a*) and 8(*b*) are perspective views showing a fixing member.
Figure 8B:
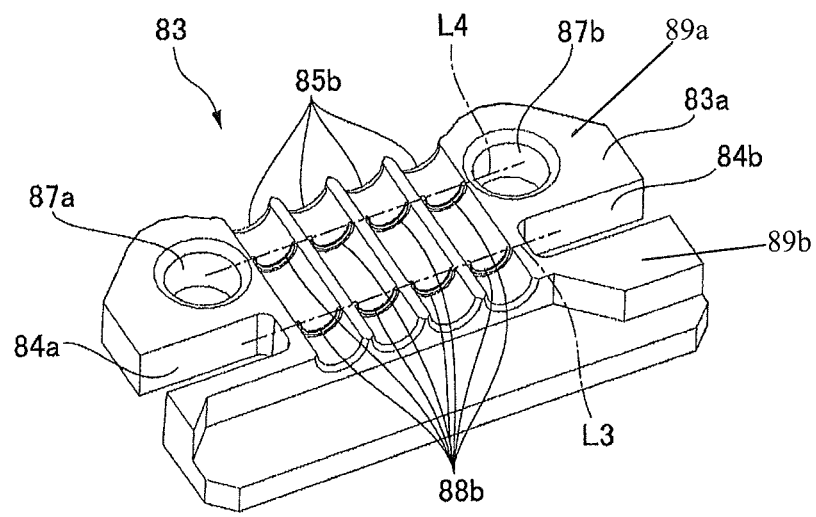

As shown in FIG. 8(a), stepped parts 83d which are lower than the upper end face 83c of the fixing member 83 are formed around the positioning holes 87a and 87b of the fixing member 83. Therefore, respective tip end faces of the positioning projections 86a and 86b by being thermally welded are lower than the upper end face 83c of the fixing member 83 and are not protruded to an upper side with respect to the end face on the upper side of the outer peripheral wall 42 (see FIGS. 1(a) and 1(c)). As described above, in this embodiment, in addition to the fixing member 83, the tip end faces of the positioning projections 86a and 86b after thermal welding is performed are also set to be lower than the end face on the upper side of the outer peripheral wall 42. Therefore, the end face on the upper side of the outer peripheral wall 42 can be tightly contacted with a main body member to which the vortex pump device 1 is attached and the vortex pump device 1 is attached to the main body member without being inclined.

As shown in FIG. 7 and FIGS. 10(a) and 10(b), a rib-shaped projection 88a is protruded to an inner side from the inner peripheral face of each of the wiring line holding grooves 85a. The rib-shaped projection 88a is a circular arc shaped projection extending in the circumferential direction along the inner peripheral face of each of the wiring line holding grooves 85a and its projecting dimension from the inner peripheral face is constant. The rib-shaped projection 88a is formed at two positions in each of the wiring line holding grooves 85a, in other words, a position on the wall face center line "L1" connecting the end parts 42a and 42b of the outer peripheral wall 42 with each other and a position on the center line "L2" connecting the center positions of the positioning projections 86a and 86b with each other. Further, as shown in FIG. 8(b), the fixing member 83 is formed with rib-shaped projections 88b at positions corresponding to the rib-shaped projections 88a of the wiring line pressing grooves 85b. A shape of the rib-shaped projection 88b is the same as the rib-shaped projection 88a. The rib-shaped projection 88b is formed at two positions, i.e., a position on the groove center line "L3" connecting the fitting grooves 84a and 84b with each other and a position on the center line "L4" by connecting the centers of the positioning holes 87a and 87b with each other.

When the fixing member 83 is attached to the wiring outlet port 81 to form the through holes 85, the rib-shaped projections 88a and 88b form the circular ring-shaped projection 88 at the position on the wall face center line "L1" connecting the end parts 42a and 42b of the outer peripheral wall 42 and at the position on the center line "L2" connecting the positioning projections 86a and 86b with each other as shown in FIG. 10(b). In this embodiment, the groove shape of the wiring line pressing grooves 85a and 85b and the projecting dimension of the rib-shaped projections 88a and 88b are set so that an inner diameter "D1" of the ring-shaped projection 88 is smaller than an outer diameter "D2" of the wiring line 7 and an inner diameter "D3" of the through hole 85 is larger than an outer diameter of the wiring line 7. Therefore, when the wiring line 7 is fitted to the through hole 85, the ring-shaped projection 88 is surely bitten into the insulation coating 7c of the wiring line 7. Further, the inner diameter "D1" of the ring-shaped projection 88 is larger than the outer diameter "D4" of the core wire 7b of the wiring line 7 and thus the ring-shaped projection 88 is prevented from damaging the core wire 7b. As a result, a sealing structure is formed in which the potting agent 64 is prevented from flowing out to an outer side from a gap space between the through hole 85 and the wiring line 7. In other words, outflow of the potting agent 64 is prevented only by structural components of the vortex pump device 1 and thus, for example, another member such as a die is not required. Especially, the ring-shaped projection 88 is provided on the wall face center line "L1" and thus a sealing effect is enhanced at the opening position of the wiring outlet part 81. Further, the ring-shaped projection 88 is disposed on the center line "L2" connecting the positioning projections 86a and 86b with each other, in other words, at the position where floating of the fixing member 83 is prevented by thermal welding and thus, also in this position, the ring-shaped projection 88 is surely bitten into the insulation coating 7c and a sealing effect is enhanced.

Further, in this embodiment, a wall thickness "d" in the wiring line length direction of the rib-shaped projections 88a and 88b is set to be smaller than the outer diameter "D2" of the wiring line 7. According to this structure, a pressing force of the fixing member 83 to the wire placing part 82 for making the ring-shaped projection 88 bite into the insulation coating 7c can be made small. Therefore, the fixing member 83 can be attached with a small force and floating of the fixing member 83 can be prevented.

(Operation and Effect)

As described above, in the vortex pump device 1 in accordance with an embodiment of the present invention, the stator accommodating chamber 17 and the upper space 18 on the upper side of the stator accommodating chamber 17 are provided in the upper case 4 of the pump case 2 and the outer peripheral wall 42 surrounding the upper space 18 and forming the side face of the pump case 2 is cut out to form the wiring outlet port 81 at which the wiring outlet part 8 is formed. Further, the wiring outlet part 8 is structured so that the wire placing part 82 is provided on an outer side of the wiring outlet port 81 and the fixing member 83 is attached so as to sandwich the wiring lines 7 between the wire placing part 82 and the fixing member 83 to close the wiring outlet port 81. According to this structure, the wiring lines 7 are taken out from the side face of the pump and thus a dimension in the axial line direction of the vortex pump device 1 can be made small and its height can be reduced. Further, different from a conventional case in which a rubber bushing is used, the fixing member 83 is not required to be previously attached to the wiring lines 7 and it is sufficient that, after the wiring lines 7 are drawn out from the wiring outlet port 81, the fixing member 83 is attached to the wiring outlet port 81. Therefore, the wiring lines 7 are taken out easily. In addition, the wiring lines 7 are sandwiched and fixed between the fixing member 83 and the wire placing part 82 and thus detachment of the wiring lines 7 is prevented. Moreover, an expensive rubber bushing is not required and thus cost can be reduced.

Further, in this embodiment, although the wiring lines 7 are taken out from the side face of the pump, outflow of the potting agent 64 from the wiring outlet port 81 is prevented and the connected parts of the wiring lines 7 with the base plate 60 on a side of the stator 50 in the stator accommodating chamber 17 (portion where the core wire 7b is exposed without the insulation coating 7c) can be covered with the potting agent 64 completely. Therefore, all the electrical conduction parts such as the drive coil 51, the base plate 60 and the connected parts of the wiring lines 7 with the base plate 60 are embedded by the potting agent 64 and the wiring lines 7 are prevented from floating upward. Further, since the electrical conduction parts are embedded with the potting agent 64, electric leakage or rust can be prevented and vibration preventing effect and noise reduction effect are obtained. In addition, when the pump case 2 is disassembled into the upper case 4 and the lower case 3, the electrical conduction parts buried with the potting agent 64 are prevented from contacting with liquid within the pump chamber 14.

Especially, in this embodiment, the base plate 60 is disposed on an upper side of the stator 50 and the wiring lines 7 are connected to the rear face 60b of the base plate 60 and thus floating of the wiring lines 7 is restrained by the base plate 60 and the wiring lines 7 are disposed at a low position. In other words, the connected parts of the wiring lines 7 (portion where the core wire 7b is not covered by the insulation coating 7c) with the base plate 60 are covered with the potting agent 64 surely. Further, the base plate 60 is also covered with the potting agent 64. Further, the pouring hole 63 for pouring the potting agent 64 is formed in the base plate 60 at a position passing the center axial line "L" of the stator 50 and thus pouring work of the potting agent 64 to the stator accommodating chamber 17 can be performed easily in a state that the base plate 60 is attached. In accordance with an embodiment of the present invention, the base plate 60 may be formed of flexible material such as elastomer or rubber material so that the base plate 60 is easy to be tightly contacted with the upper case 4.

In addition, in this embodiment, the wiring outlet part 8 is formed at a corner part of a side face portion of the pump case 2 in a rectangular prism shape and a portion of dead space of the pump case 2 is utilized to compactly structure the wiring outlet part 8. Therefore, the size of the vortex pump device 1 can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A vortex pump device comprising:
a rotor and a stator which are coaxially disposed with each other;
an impeller which is provided in the rotor;
a pump case which forms a pump chamber in which the impeller is disposed and a stator accommodating chamber partitioned from the pump chamber, a side face of the pump case being provided with a suction pipe and a discharge pipe;
wherein the pump case is provided with an outer peripheral wall surrounding an upper space formed on an upper side with respect to a stator accommodating position in the stator accommodating chamber, the outer peripheral wall forming a side face of the pump case;
a base plate which is disposed in the upper space;
a sealing agent which is filled in the pump case to a height covering the base plate; and
a wiring outlet part for taking out a wiring line within the pump case to an outer side;
and
wherein the wiring outlet part comprises:

a wiring outlet port formed by cutting out the outer peripheral wall;

a wire placing part on which the wiring line taken out from the wiring outlet port to the outer side is placed; and a fixing member with which the wiring line is sandwiched and fixed between the wire placing part, the fixing member being attached so as to close the wiring outlet port;

the fixing member is located at a lower position than an end face on an upper side of the outer peripheral wall, the sealing agent is filled to a lower position with respect to the upper surface of the fixing member, the fixing member is formed with a pair of fitting grooves which are formed by cutting out edge portions in a widthwise direction of the fixing member;

the fixing member comprises an outer width portion which is located radially outward of the fitting grooves, an inner width portion which is located radially inward of the fitting grooves, and a narrow portion connected between the outer width portion and the inner width potion;

wherein end parts of the outer peripheral wall facing across the wiring outlet port are respectively fitted to the fitting grooves; and a groove side face of the fitting groove to which the end part of the outer peripheral wall is fitted and a surface of the outer peripheral wall diametrically facing the groove side face form a labyrinth structure part.

2. The vortex pump device according to claim 1, wherein the pump case is provided with an upper case and a lower case which are assembled in a superposed state in an upper and lower direction, the pump chamber is provided between the lower case and the upper case, and the stator accommodating chamber and the upper space is provided by the upper case.

3. The vortex pump device according to claim 2, wherein the end face of the upper side of the outer peripheral wall is an attaching face to a member to which the vortex pump device is to be attached.

4. The vortex pump device according to claim 1, wherein a width of the fixing member is wider than an opening width of the wiring outlet port.

5. The vortex pump device according to claim 1, wherein the wire placing part is formed with a wiring line holding groove, a wiring line pressing groove is formed in the fixing member at a position facing the wiring line holding groove, and the wiring line holding groove and the wiring line pressing groove form a through hole through which the wiring line is passed when the fixing member is attached to the wiring outlet port.

6. The vortex pump device according to claim 5, wherein a rib-shaped projection protruding to an inner side is formed on each of inner peripheral faces of the wiring line holding groove and the wiring line pressing groove, the rib-shaped projection is extended in a circumferential direction and, when the wiring line holding groove and the wiring line pressing groove form the through hole, the rib-shaped projections form a ring-shaped projection, a surface of the wiring line is covered with insulation coating having resilience, and an inner diameter of the ring-shaped projection is smaller than an outer diameter of the wiring line and is larger than an outer diameter of a core wire of the wiring line.

7. The vortex pump device according to claim 6, wherein a wall thickness of the rib-shaped projection in a wiring line length direction is smaller than an outer diameter of the wiring line.

8. The vortex pump device according to claim 6, wherein the rib-shaped projection is formed on a line connecting end parts of the outer peripheral wall facing across the wiring outlet port with each other.

9. The vortex pump device according to claim 6, wherein the wire placing part is formed with a positioning projection protruding to a side of the fixing member, a positioning hole is formed in the fixing member at a position corresponding to the positioning projection, and the positioning projection is fixed to the positioning hole by thermal welding.

10. The vortex pump device according to claim 6, wherein the wire placing part is formed with a pair of positioning projections protruding to a side of the fixing member at a pair of positions interposing the wiring line holding groove in a groove width direction, a positioning hole is formed in the fixing member at positions corresponding to the respective positioning projections, and the positioning projections are fixed to the positioning holes by thermal welding.

11. The vortex pump device according to claim 10, wherein the rib-shaped projection is formed on a line connecting the pair of the positioning projections with each other.

12. The vortex pump device according to claim 11, wherein the fixing member which is attached to the wiring outlet port and a tip end of the positioning projection which is thermally welded to the fixing member do not protrude to an upper side with respect to an upper end of the outer peripheral wall.

13. The vortex pump device according to claim 1, wherein the pump case is formed in a roughly prism shape, and the wiring outlet part is formed at a corner part of a side face portion of the pump case.

14. The vortex pump device according to claim 6, further comprising a base plate which is disposed on an upper side of the stator and is embedded with the sealing agent together with the stator, wherein one end of the wiring line is connected to a face on a stator side of the base plate at a same height as the wiring line holding groove.

15. The vortex pump device according to claim 1, wherein the base plate is disposed on an upper side of the stator and is embedded with the sealing agent together with the stator, wherein one end of the wiring line is connected to a face on a stator side of the base plate and is connected to a drive coil of the stator through the base plate.

16. The vortex pump device according to claim 15, wherein the drive coil of the stator is connected to a face of the base plate which is opposite to the stator.

17. The vortex pump device according to claim 15, wherein the base plate is formed with a pouring hole for the sealing agent, and the pouring hole is disposed on a center axial line of the stator.

18. The vortex pump device according to claim 1, wherein the sealing agent is thermosetting resin.

19. A vortex pump device comprising:

a pump case which forms a pump chamber and a stator accommodating chamber partitioned from the pump chamber, a side face of the pump case being provided with a suction pipe and a discharge pipe;

wherein the pump case is provided with an outer peripheral wall surrounding an upper space formed on an upper side with respect to a stator accommodating position in the stator accommodating chamber, the outer peripheral wall forming a side face of the pump case;

a base plate which is disposed in the upper space;

a wiring outlet part for taking out a wiring line within the pump case to an outer side; and wherein the wiring outlet part comprises:

a wiring outlet port formed by cutting out the outer peripheral wall;

a wire placing part on which the wiring line taken out from the wiring outlet port to the outer side is placed; and a fixing member with which the wiring line is sandwiched and fixed between the wire placing part, the fixing member being attached so as to close the wiring outlet port;

the fixing member is located at a lower position than an end face on an upper side of the outer peripheral wall, the sealing agent is filled to a lower position with respect to the upper surface of the fixing member, the fixing member is formed with a pair of fitting grooves which are formed by cutting out edge portions in a widthwise direction of the fixing member;

the fixing member comprises an outer width portion which is located radially outward of the fitting grooves, an inner width portion which is located radially inward of the fitting grooves, and a narrow portion connected between the outer width portion and the inner width potion;

wherein end parts of the outer peripheral wall facing across the wiring outlet port are respectively fitted to the fitting grooves; and a groove side face of the fitting groove to which the end part of the outer peripheral wall is fitted and a surface of the outer peripheral wall diametrically facing the groove side face form a labyrinth structure part.

20. The vortex pump device according to claim 1, the fixing member is press-fitted and fixed between the end parts.

* * * * *